US012410901B2

(12) United States Patent
Lim et al.

(10) Patent No.: US 12,410,901 B2
(45) Date of Patent: Sep. 9, 2025

(54) LIGHTING DEVICE

(71) Applicant: LG INNOTEK CO., LTD., Seoul (KR)

(72) Inventors: Eay Jin Lim, Seoul (KR); Kwang Hyun Ko, Seoul (KR); Hyun Duck Yang, Seoul (KR); Dong Hyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/849,054

(22) PCT Filed: Apr. 4, 2023

(86) PCT No.: PCT/KR2023/004540
§ 371 (c)(1),
(2) Date: Sep. 20, 2024

(87) PCT Pub. No.: WO2023/195748
PCT Pub. Date: Oct. 12, 2023

(65) Prior Publication Data

US 2025/0198588 A1 Jun. 19, 2025

(30) Foreign Application Priority Data

Apr. 4, 2022 (KR) ........................ 10-2022-0041872
Jul. 5, 2022 (KR) ........................ 10-2022-0082522
Mar. 2, 2023 (KR) ........................ 10-2023-0027665

(51) Int. Cl.
*F21S 43/15* (2018.01)
*F21S 4/24* (2016.01)
(Continued)

(52) U.S. Cl.
CPC ................. *F21S 43/15* (2018.01); *F21S 4/24* (2016.01); *F21S 43/249* (2018.01);
(Continued)

(58) Field of Classification Search
CPC ............ F21S 4/00–28; F21S 43/14–37; F21W 2103/55; F21Y 2103/10; F21Y 2115/10
See application file for complete search history.

(56) References Cited

U.S. PATENT DOCUMENTS 10,240,755 B2 * 3/2019 Huang ...................... F21V 5/04
10,274,166 B2 4/2019 Li et al.
(Continued)

FOREIGN PATENT DOCUMENTS

KR 10-2015-0023014 3/2015
KR 10-2015-0084904 7/2015
(Continued)

OTHER PUBLICATIONS

International Search Report dated Jul. 13, 2023 issued in Application No. PCT/KR2023/004540.

*Primary Examiner* — Jason M Han
(74) *Attorney, Agent, or Firm* — KED & ASSOCIATES, LLP

(57) ABSTRACT

A lighting device disclosed in an embodiment of the invention comprises a substrate; a plurality of light sources arranged in a second direction on the substrate; a lighting module having a light guide portion disposed on the substrate and the light sources; an optical lens disposed on the lighting module, the optical lens having an incident surface having a width greater than a width of the lighting module in a first direction, and an exit surface from which light incident on the incident surface is emitted; and a reflecting member having an insertion hole in which the light guide portion is disposed, a reflective portion extending to both sides of the insertion hole and covering both sides of the light guide portion, and a supporting portion supporting a lower edge of the optical lens, wherein the light guide portion and the insertion hole have a width in the first direction smaller than a length in the second direction, and
(Continued)

an upper end of the reflective portion may be positioned higher than an upper end of the light guide portion.

20 Claims, 21 Drawing Sheets

(51) Int. Cl.

| | |
|---|---|
| ***F21S 43/14*** | (2018.01) |
| ***F21S 43/20*** | (2018.01) |
| ***F21S 43/249*** | (2018.01) |
| ***F21S 43/31*** | (2018.01) |
| ***F21S 43/37*** | (2018.01) |
| ***F21W 103/55*** | (2018.01) |
| ***F21Y 103/10*** | (2016.01) |
| ***F21Y 115/10*** | (2016.01) |

(52) U.S. Cl.
CPC ......... *F21S 43/26241* (2024.05); *F21S 43/31* (2018.01); *F21S 43/37* (2018.01); *F21S 43/14* (2018.01); *F21W 2103/55* (2018.01); *F21Y 2103/10* (2016.08); *F21Y 2115/10* (2016.08)

(56) References Cited

U.S. PATENT DOCUMENTS

| | | | | |
|---|---|---|---|---|
| 10,405,396 | B2 * | 9/2019 | Gawel .................... | H05B 45/22 |
| 11,015,790 | B2 | 5/2021 | Chen et al. | |
| 11,360,255 | B2 | 6/2022 | Oh et al. | |
| 2014/0211449 | A1 | 7/2014 | Nomura et al. | |
| 2015/0319329 | A1 | 11/2015 | Matsuzawa et al. | |

FOREIGN PATENT DOCUMENTS

| | | |
|---|---|---|
| KR | 10-2020-0071245 | 6/2020 |
| KR | 10-2327855 | 11/2021 |

* cited by examiner

【FIG. 1】
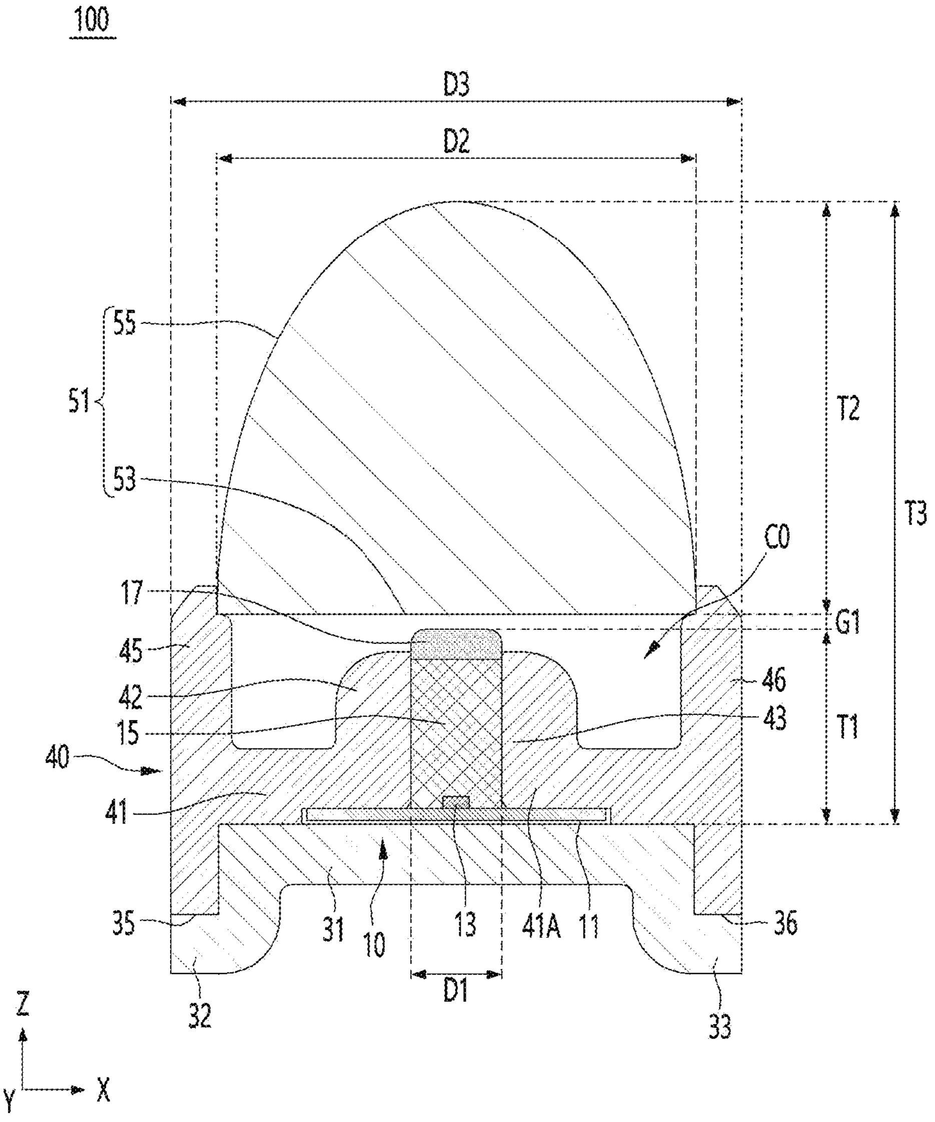

【FIG. 2】
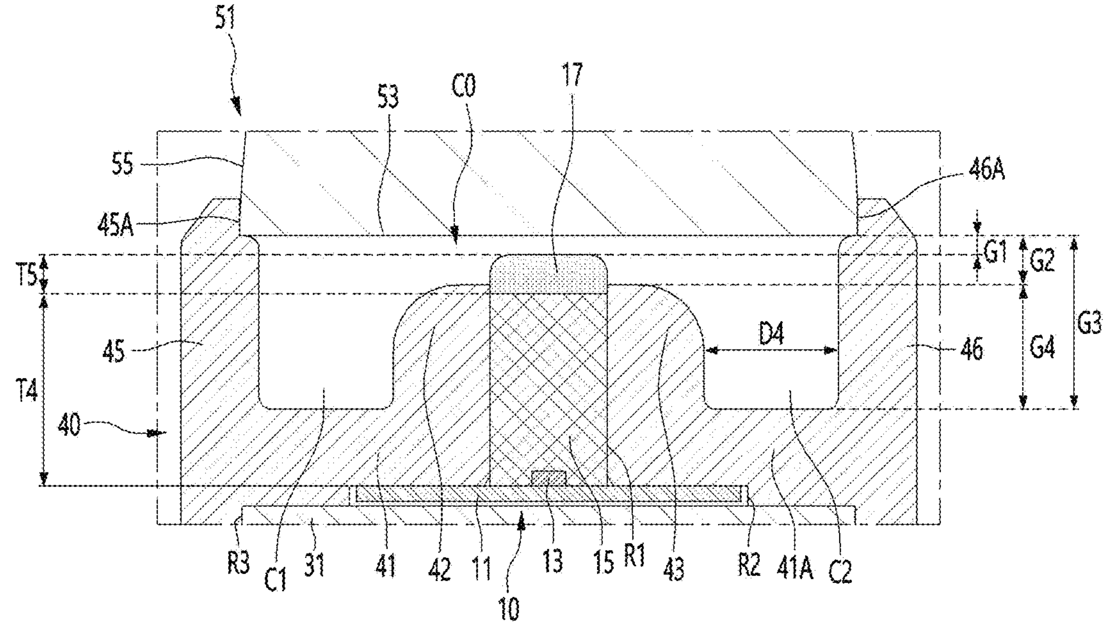
【FIG. 3】
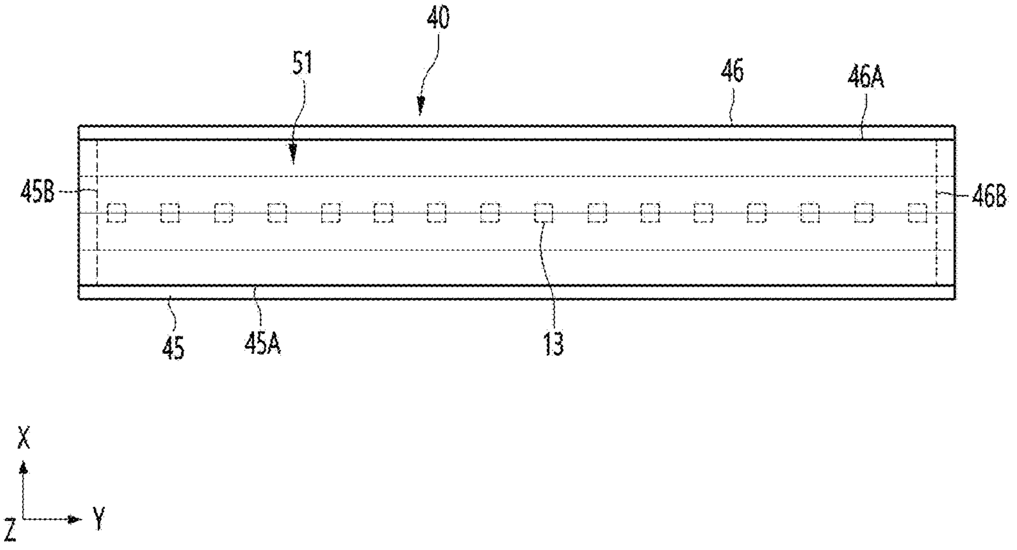

【FIG. 4】
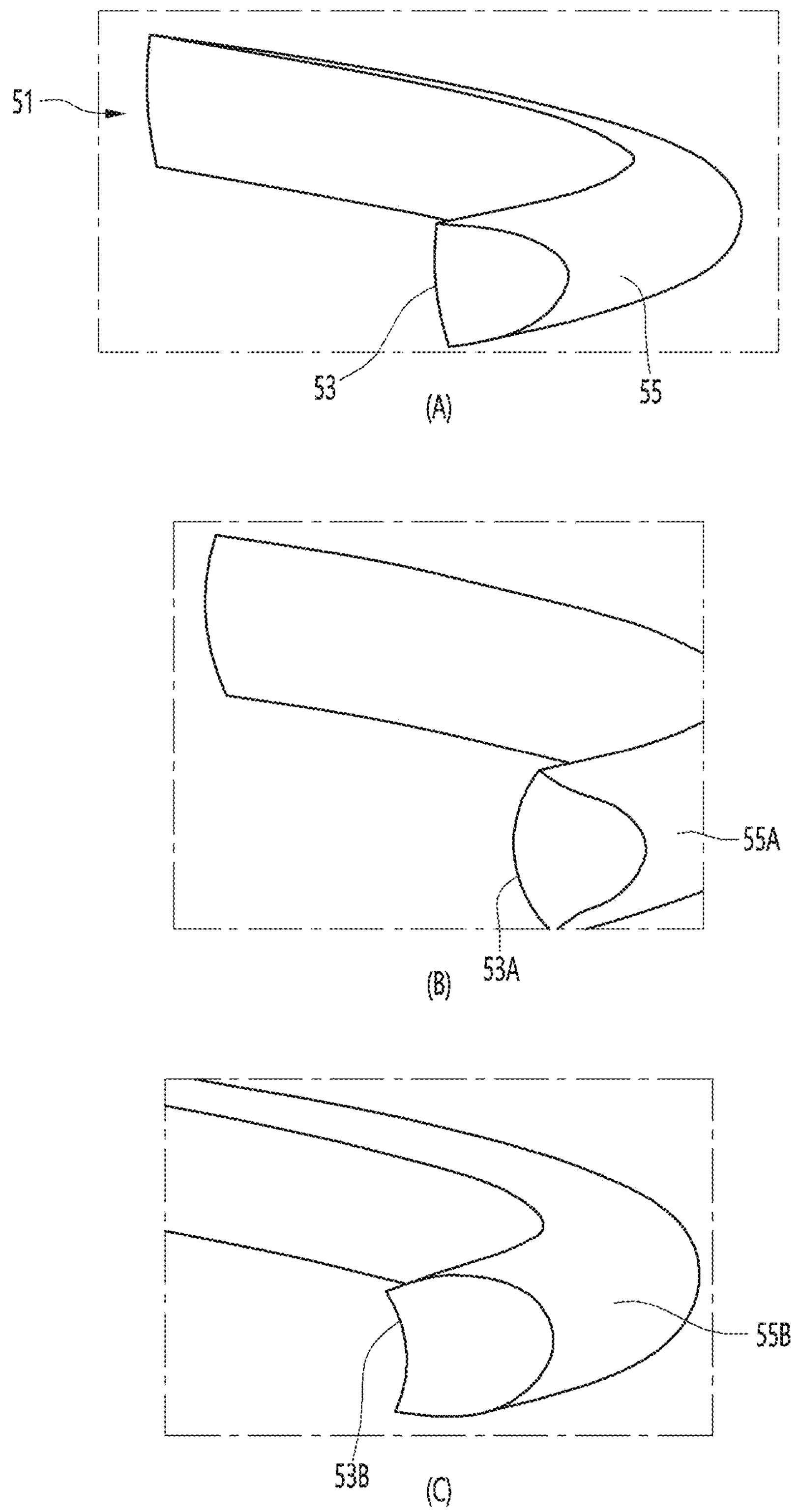

【FIG. 5】
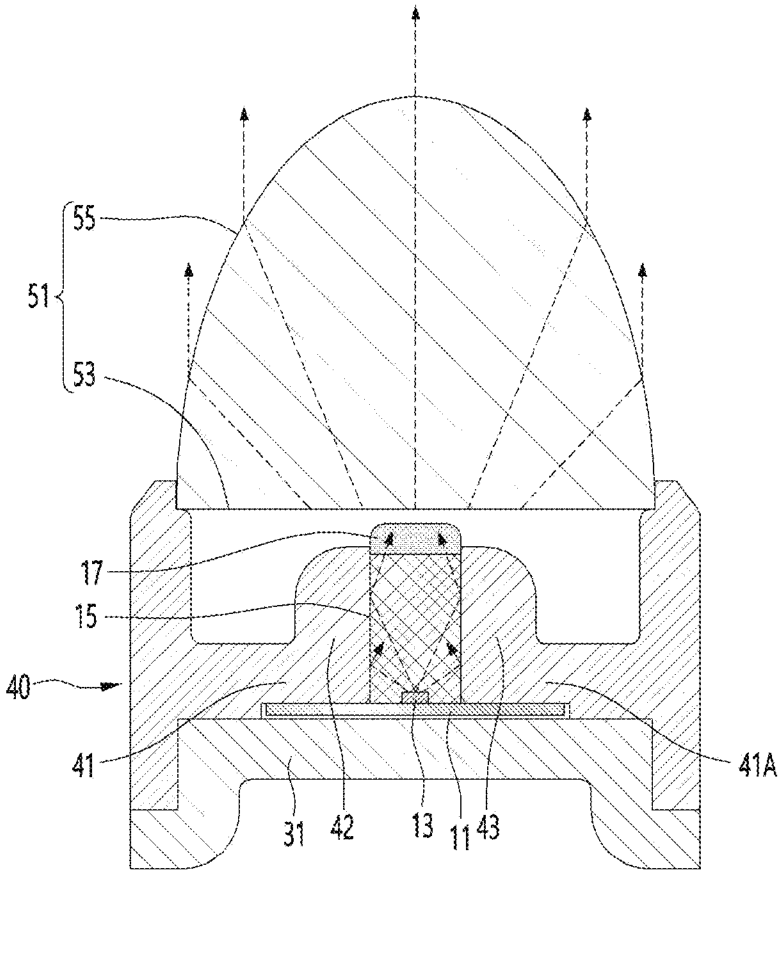

【FIG. 6】
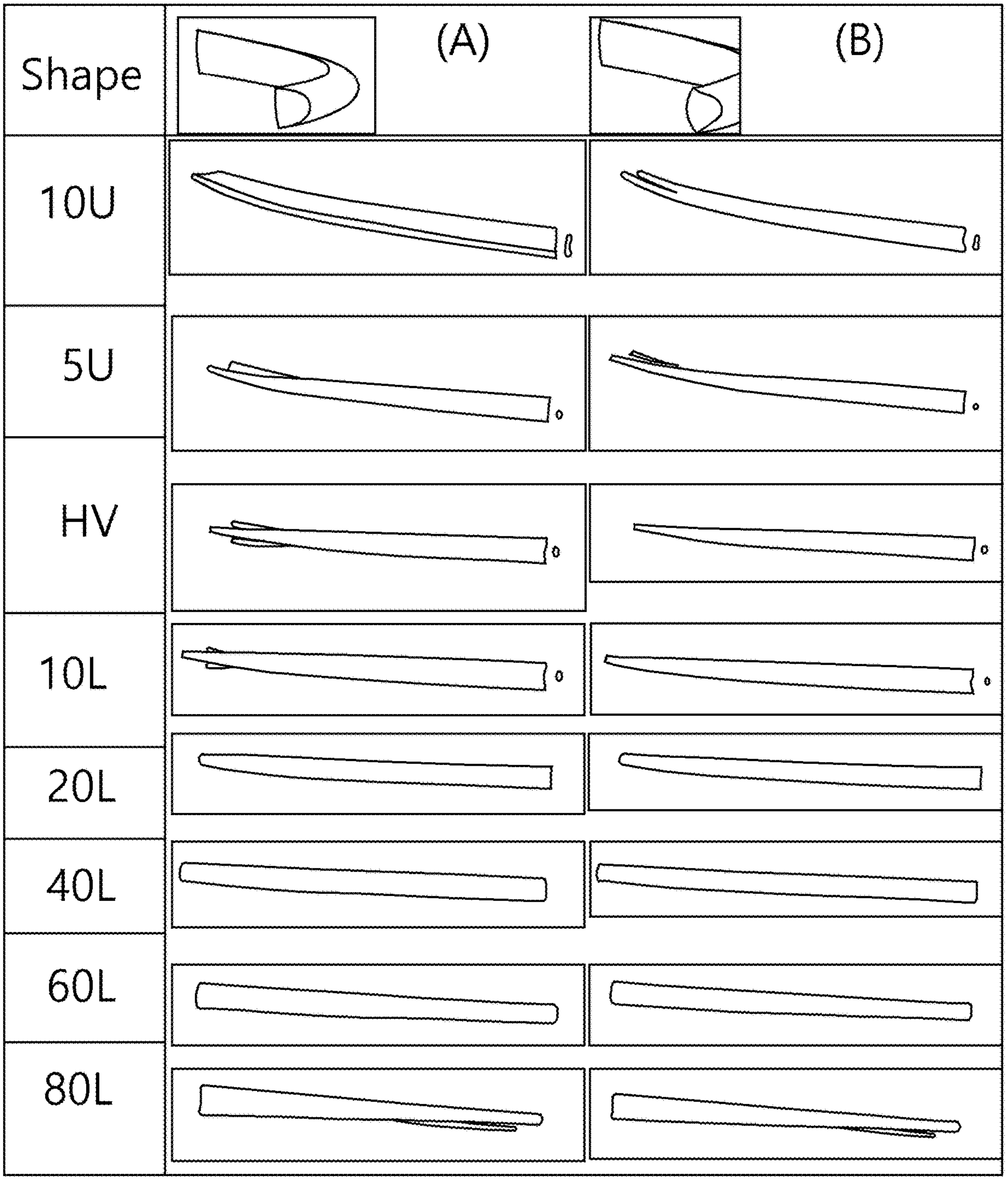

【FIG. 7】
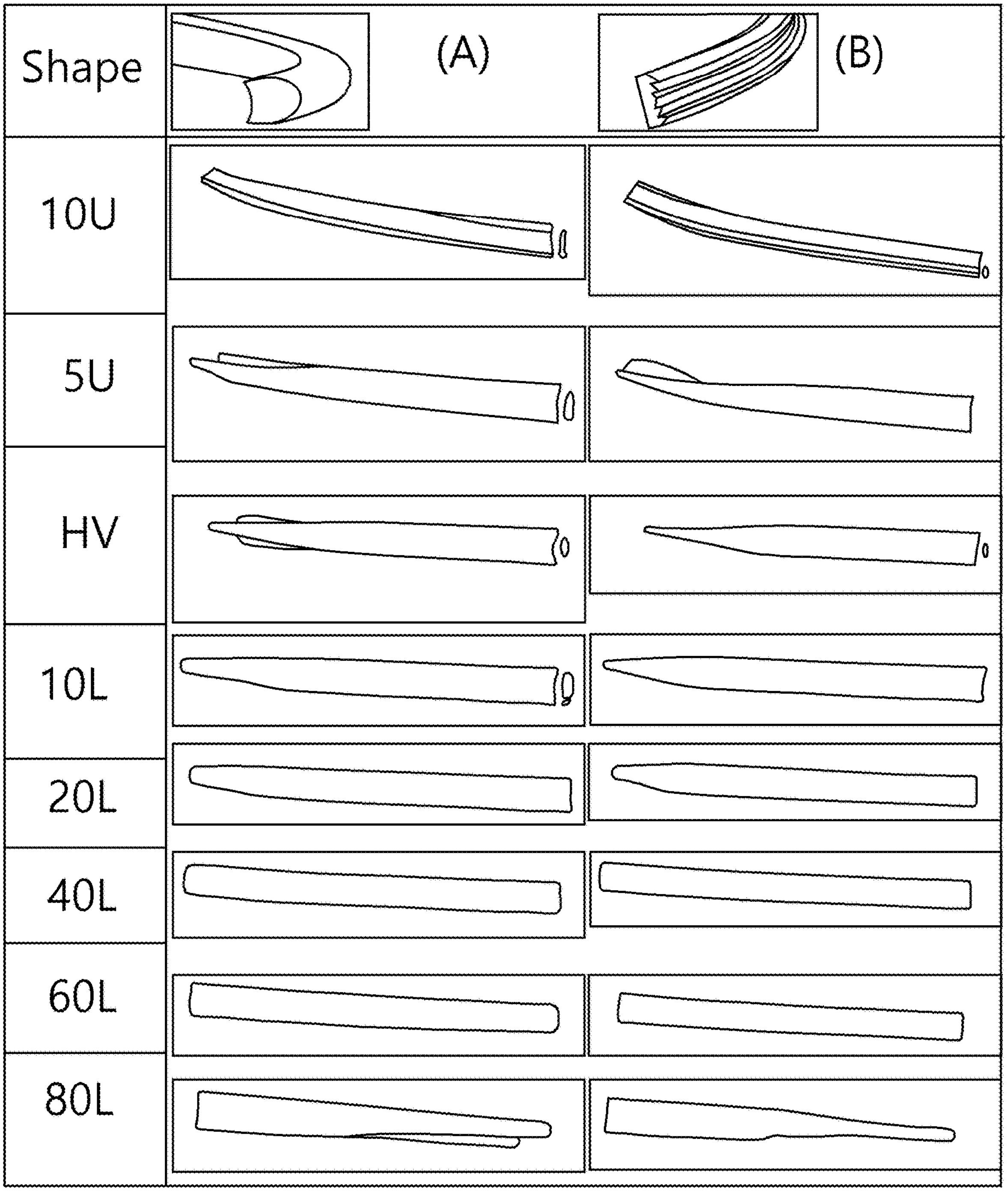

【FIG. 8】
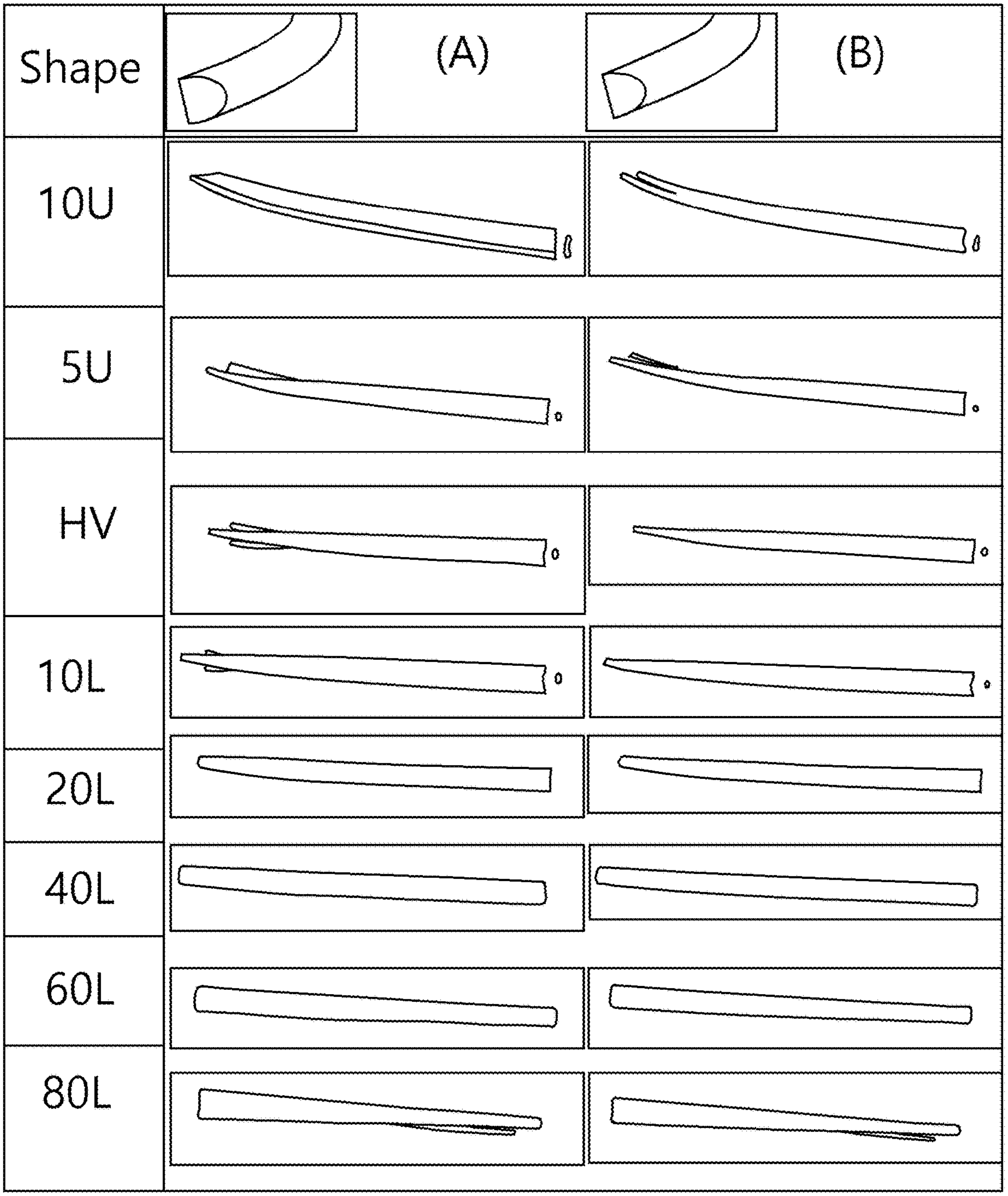

【FIG. 9】
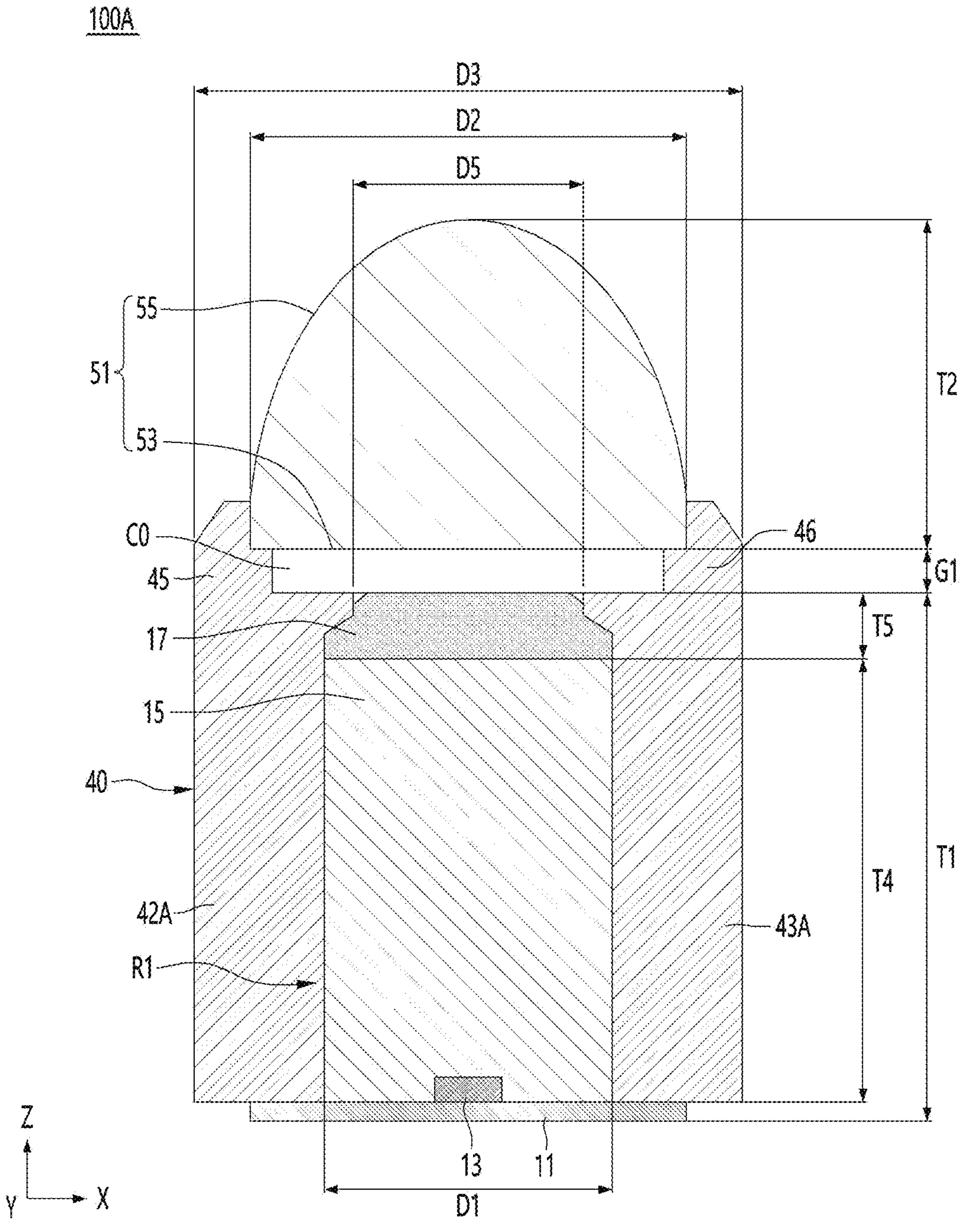

【FIG. 10】
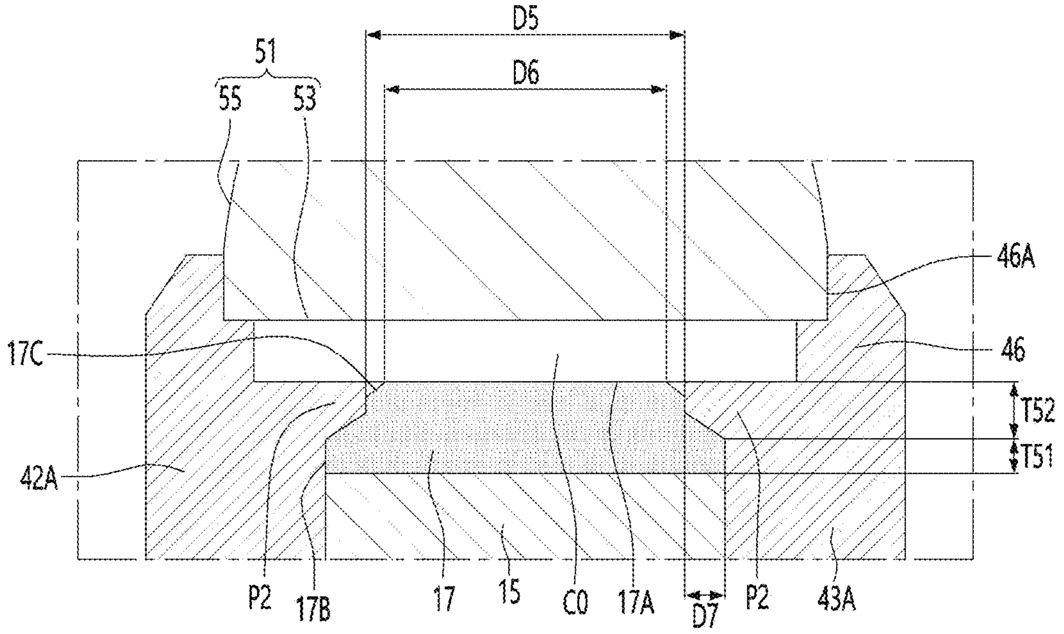

【FIG. 11】
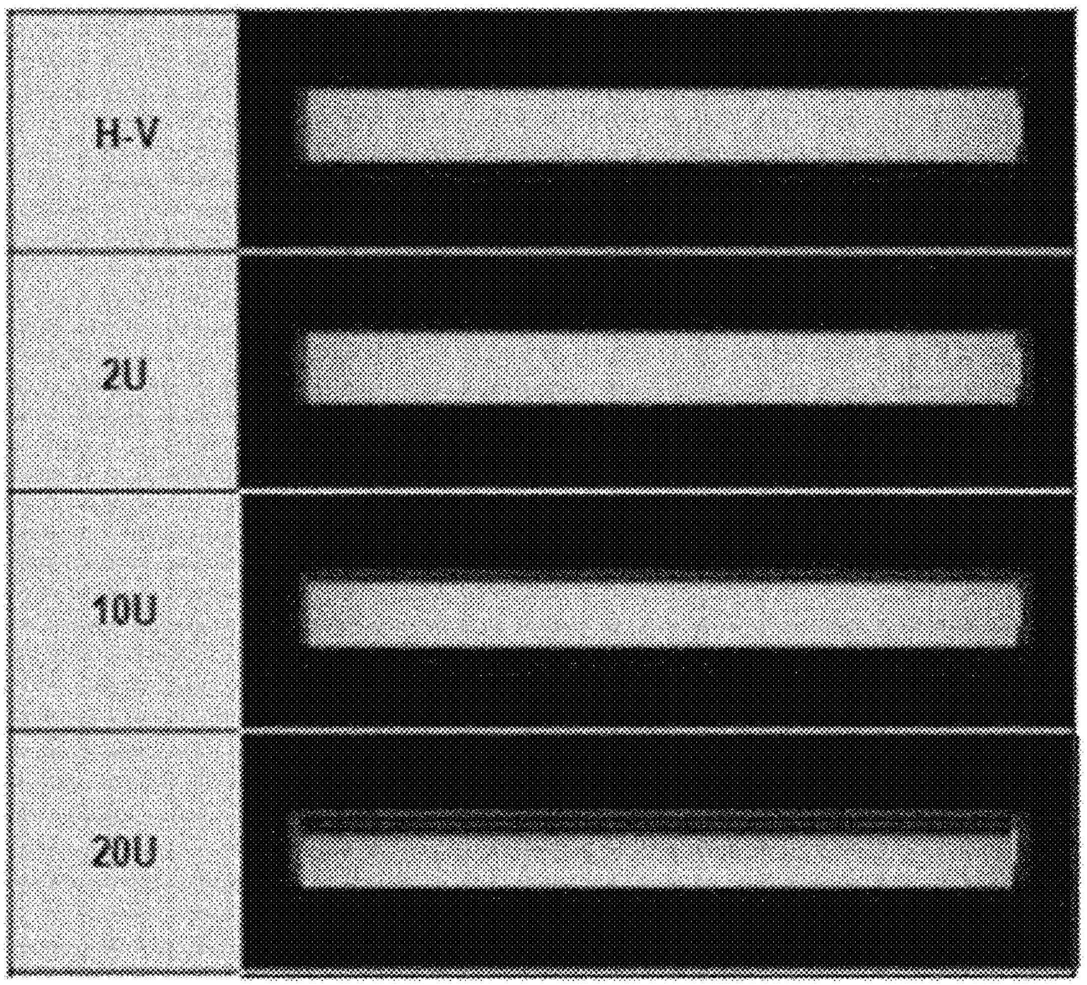

【FIG. 12】
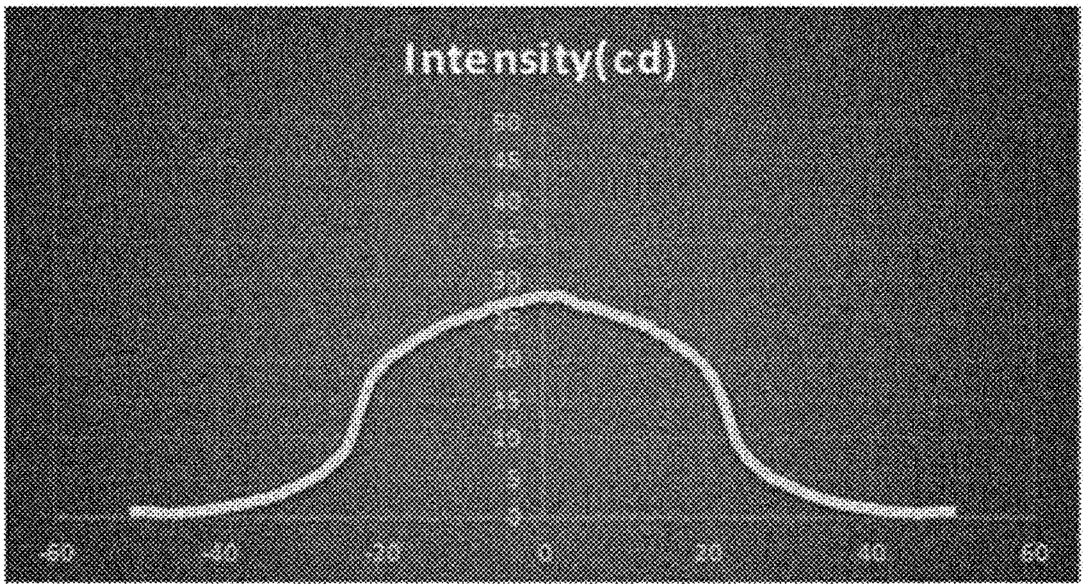

【FIG. 13】
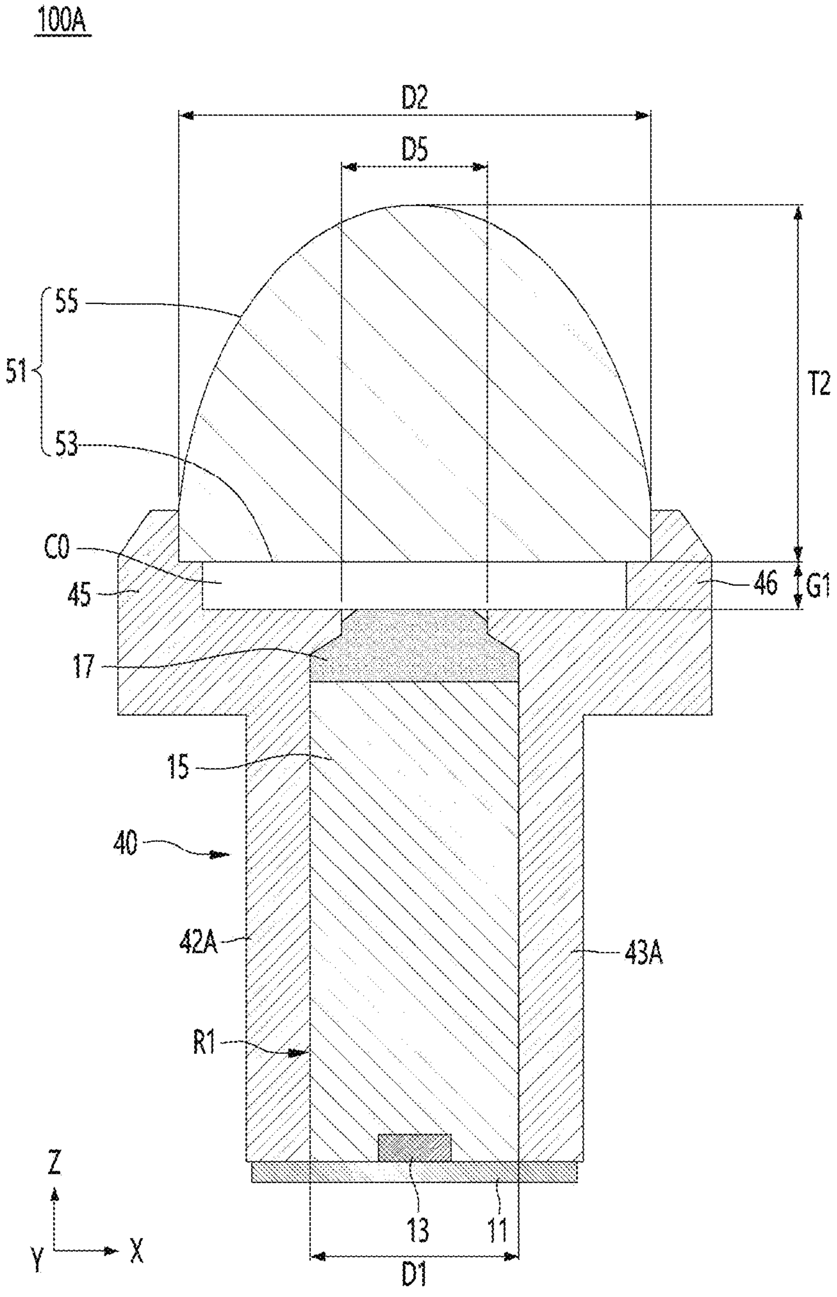

【FIG. 14】
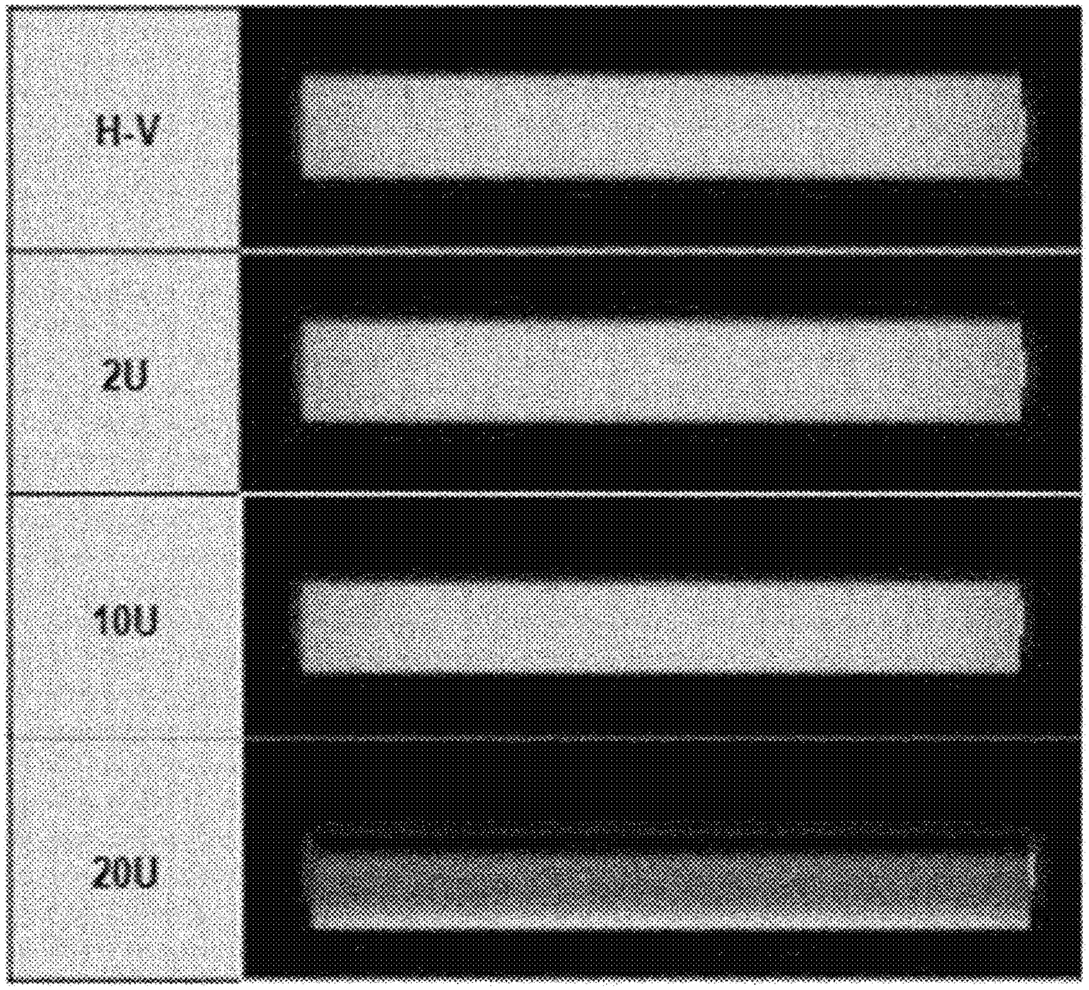

【FIG. 15】
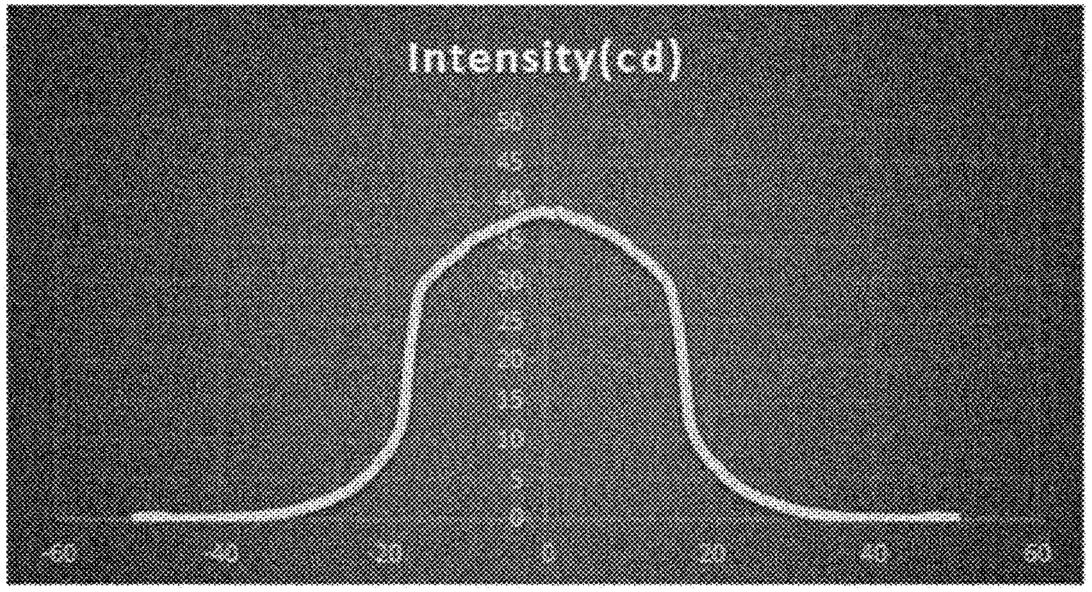

【FIG. 16】
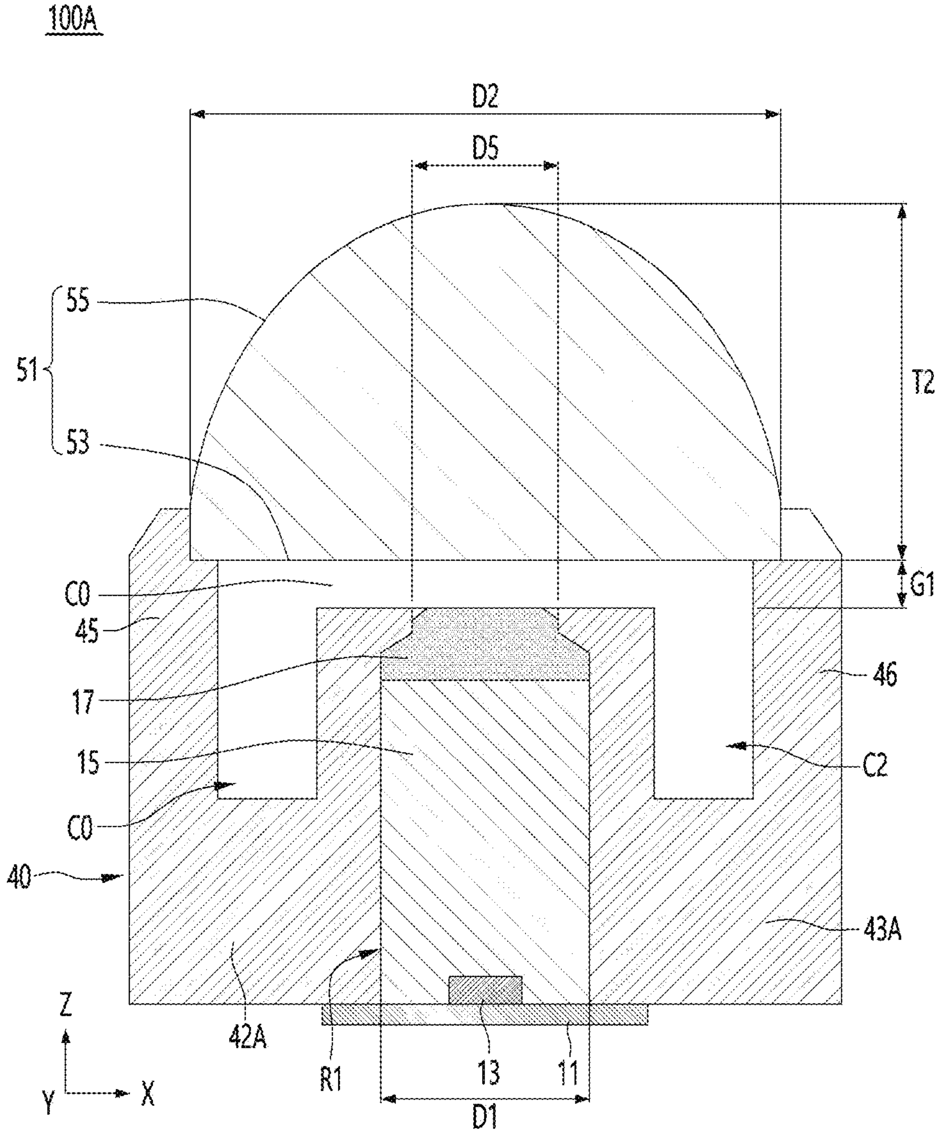

【FIG. 17】
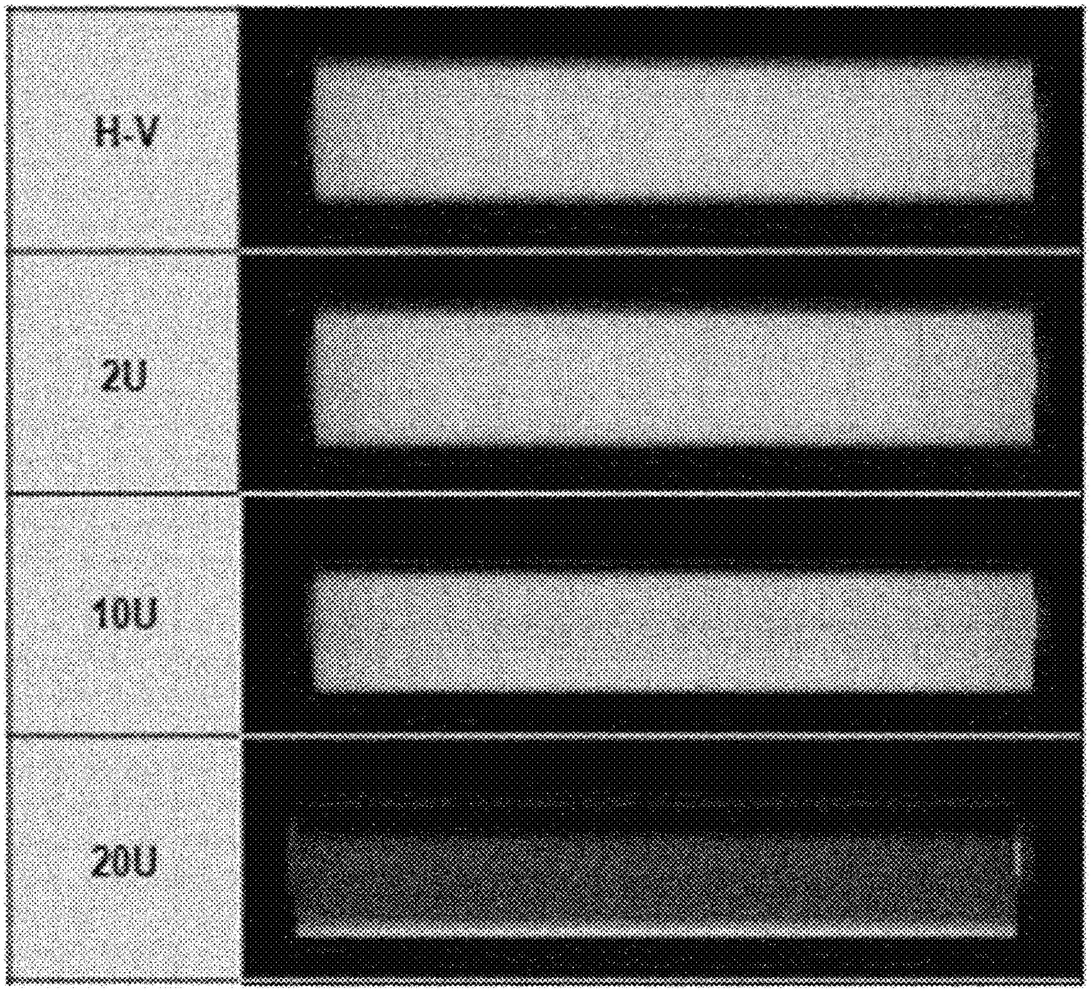

【FIG. 18】
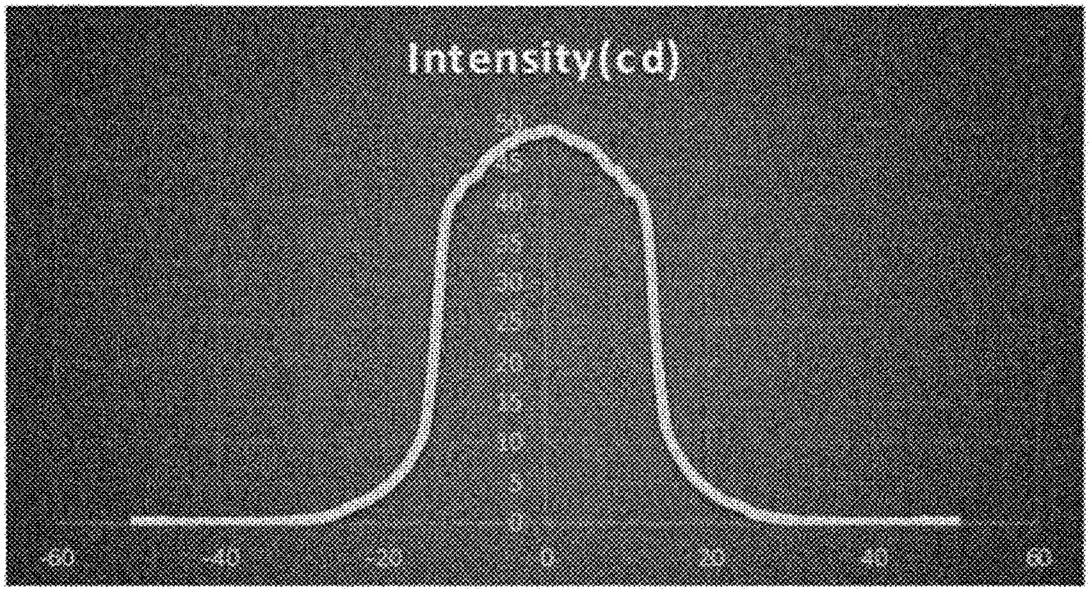

【FIG. 19】
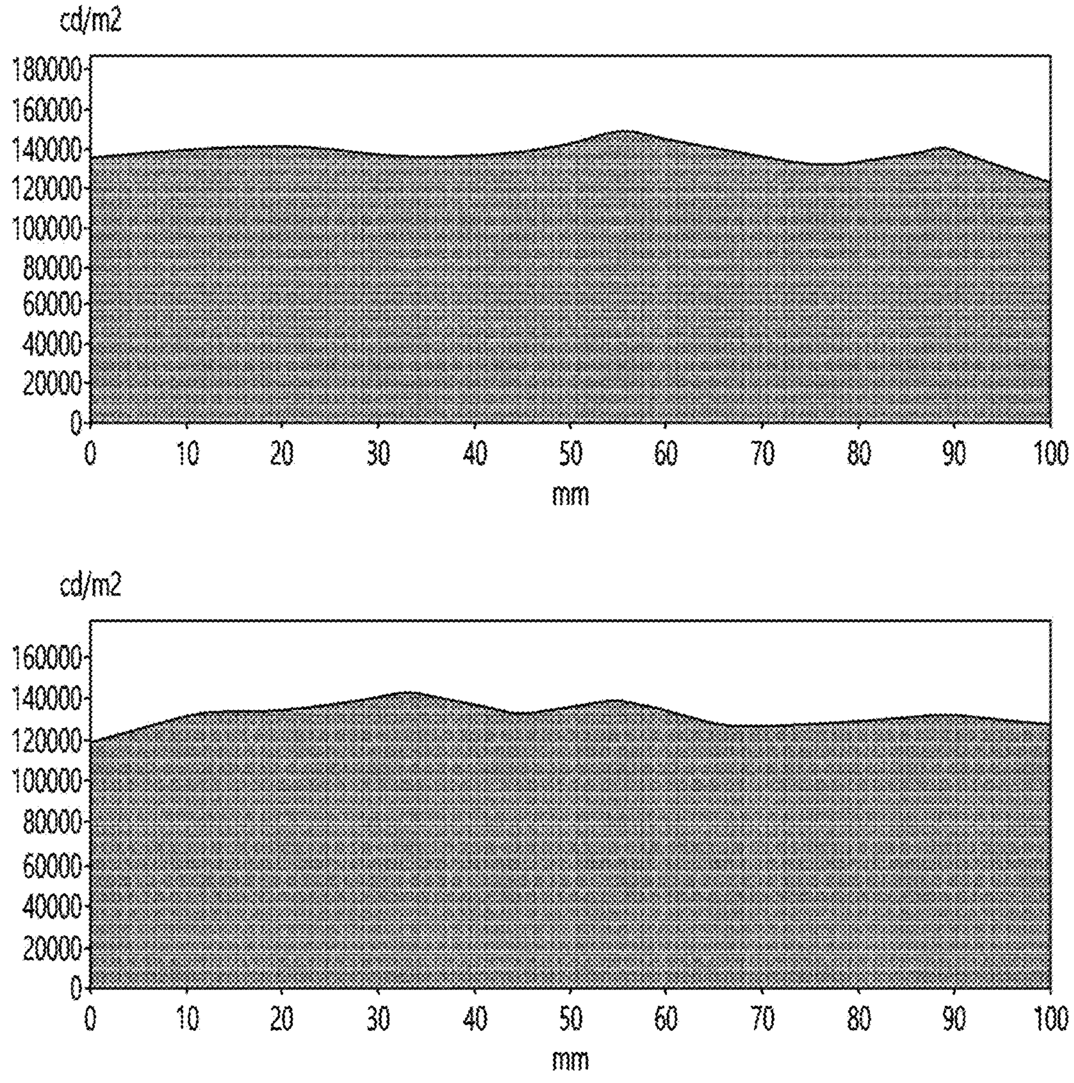

【FIG. 20】
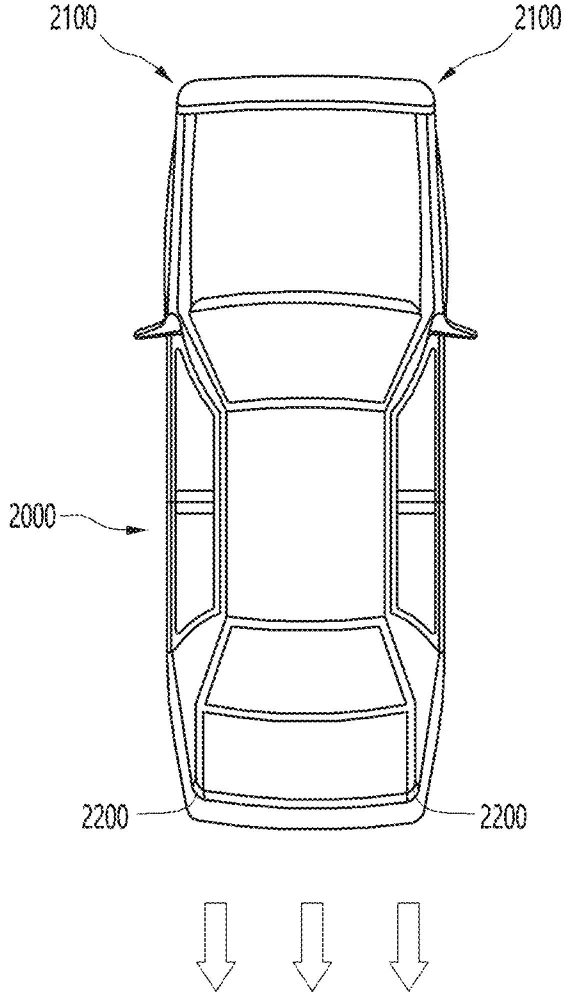

【FIG. 21】
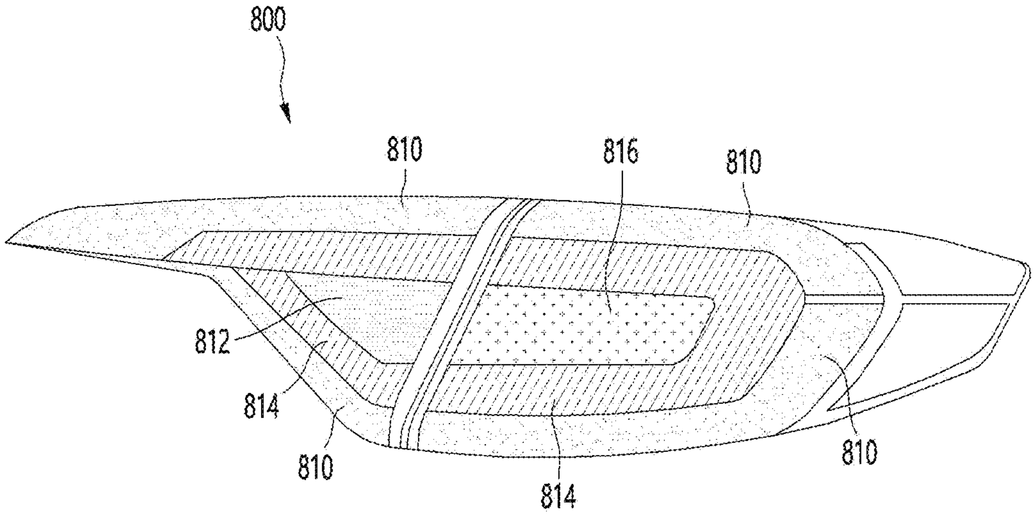

【FIG. 22】
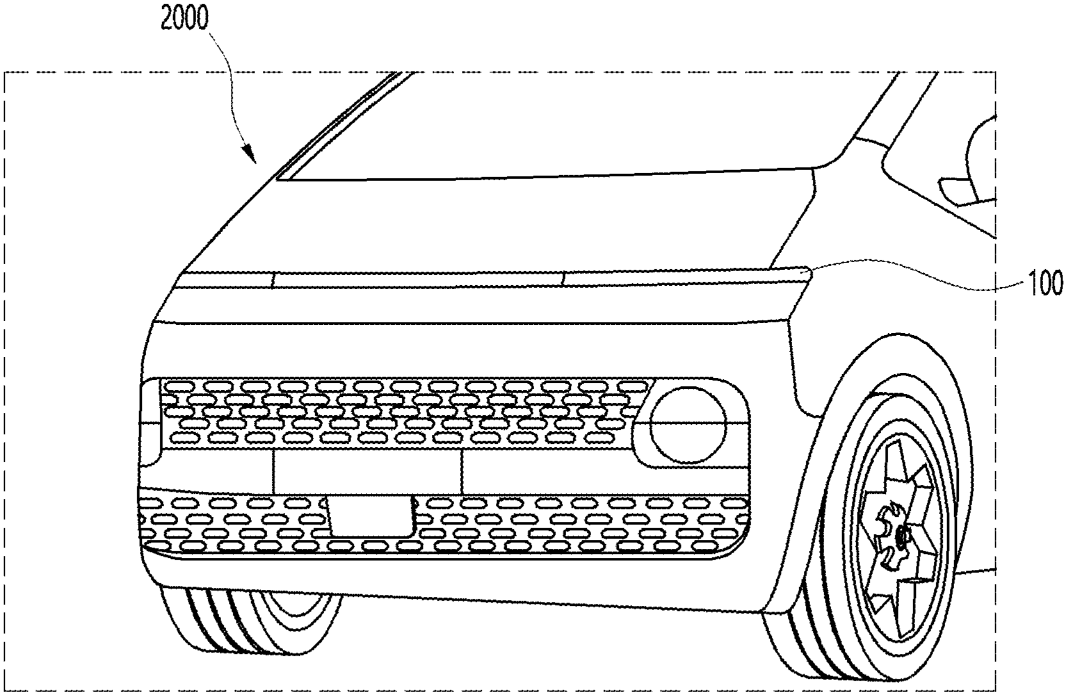

LIGHTING DEVICE

CROSS-REFERENCE TO RELATED PATENT APPLICATIONS

This application is a U.S. National Stage Application under 35 U.S.C. § 371 of PCT Application No. PCT/KR2023/004540, filed Apr. 4, 2023, which claims priority to Korean Patent Application Nos. 10-2022-0041872, filed Apr. 4, 2022, 10-2022-0082522, filed Jul. 5, 2022 and 10-2023-0027665, filed Mar. 2, 2023, whose entire disclosures are hereby incorporated by reference.

TECHNICAL FIELD

An embodiment relates to a lighting device having a light source. One embodiment relates to a vehicle lamp having a lighting device.

BACKGROUND ART

Lighting applications include vehicle lights as well as backlights for displays and signs. Light emitting device, such as light emitting diode (LED), have advantages such as low power consumption, semi-permanent life, fast response speed, safety, and environmental friendliness compared to conventional light sources such as fluorescent lamps and incandescent lamps. These light emitting diodes are applied to various display devices, various lighting devices such as indoor or outdoor lights. Recently, as a vehicle light source, a lamp employing a light emitting diode has been proposed. Compared with incandescent lamps, light emitting diodes are advantageous in that power consumption is small. However, since an emission angle of light emitted from the light emitting diode is small, when the light emitting diode is used as a vehicle lamp, there is a demand for increasing the light emitting area of the lamp using the light emitting diode. Light emitting diodes can increase the design freedom of lamps because of their small size, and they are also economical because of their semi-permanent lifespan.

DISCLOSURE

Technical Problem

An embodiment of the invention provides a lighting device having an improved light distribution image. An embodiment of the invention provides a lighting device having a line width and made of a flexible material for a daytime running light (DRL). An embodiment of the invention can provide a lamp for a vehicle such as a mobile body having the lighting device described above.

Technical Solution

The lighting device according to an embodiment of an invention comprises a substrate having a length in a second direction longer than a width in a first direction; a plurality of light sources arranged on the substrate in a second direction; a lighting module having a light guide portion disposed on the substrate and the light sources; an optical lens disposed on the lighting module, the optical lens having an incident surface having a width greater than a width of the lighting module in the first direction, and an exit surface from which light incident on the incident surface is emitted; and a reflective member having an insertion hole in which the light guide portion is disposed, a reflective portion extending to both sides of the insertion hole and covering both sides of the light guide portion, and a support portion supporting a lower edge of the optical lens, wherein the light guide portion and the insertion hole have a width in the first direction smaller than a length in the second direction, and an upper end of the reflective portions may be positioned higher than an upper end of the light guide portion.

According to an embodiment of the invention, the exit surface of the optical lens may refract light incident on the incident surface into parallel light.

According to an embodiment of the invention, a diffusion layer for diffusing light is included on the light guide portion, and an upper end of the diffusion layer may be positioned higher than the upper end of the reflective portion.

The diffusion layer is spaced apart from an incident surface of the light guide portion, and a width of the diffusion layer in the first direction may be the same as a width of the light guide portion in the first direction, and a length in the second direction may be the same as a length of the light guide portion in the second direction.

According to an embodiment of the invention, the incident surface may be any one of a concave curved surface, a convex curved surface, or a plane in a short axis direction. The exit surface may have a hemispherical shape or a Fresnel lens pattern.

According to an embodiment of the invention, a housing is included under the reflective member, and the reflective member may include a first recess in which the substrate is received and a second recess in which an upper portion of the housing is received. The reflective member may have a concave groove between the support portion and the reflective portion.

According to an embodiment of the invention, a material of the optical lens is PMMA or PC, and the light guide portion may seal the light sources and be formed of a silicone or epoxy material. The width of the light guide portion in the first direction is in a range of 3 mm to 7 mm, and the length of the light guide portion in the second direction may be 50 times or more the width of the first direction.

A lighting device according to an embodiment of the invention comprises a substrate; a plurality of light sources arranged in one direction on the substrate; a lighting module having a light guide portion covering the plurality of light sources and having a length longer than a width and a diffusion layer disposed on the light guide portion; an optical lens disposed on the lighting module and having an incident surface having a width greater than the width of the lighting module, and an exit surface from which light incident on the incident surface is emitted; and a reflective member having an insertion hole into which the light guide is inserted, a reflective member extending to both sides of the insertion hole and disposed along a periphery of the light guide portion, and a support member supporting a lower edge of the optical lens, wherein the light guide portion and the insertion hole have a length that is at least twice as large as a width, the reflective portion of the reflective member are disposed along both long sides and both short sides of the light guide portion, and the lighting module and the optical lens may have flexibility in a thickness direction and a width direction of the lighting module with respect to a length direction.

According to an embodiment of the invention, an upper end of the reflective member may be positioned higher than an upper end of the light guide portion and lower than an upper end of the diffusion layer. The reflective member may have a concave groove between both outer sides of the reflective member at an inner side and both inner sides of the support member at an outer side. The exit surface of the optical lens may emit parallel light.

A lighting device according to an embodiment of the invention comprises a substrate having a length in a second direction that is longer than a width in a first direction; a plurality of light sources disposed in a second direction on the substrate; a light guide portion arranged on the substrate and covering the plurality of light sources; a diffusion layer disposed on the light guide portion; an optical lens having an incident surface spaced apart from the diffusion layer and having a width greater than a width of the diffusion layer in the first direction, and an exit surface from which light incident on the incident surface is emitted; and a reflection member having an insertion hole in which the light guide portion and the diffusion layer are disposed inside, first and second reflective portions covering extensions to both sides of the insertion hole, and a support portion supporting both edges of the optical lens, wherein the diffusion layer may have an upper width in the first direction smaller than a lower width.

According to an embodiment of the invention, the diffusion layer includes a first region having a width equal to the width of the light guide portion, and a second region having a width smaller than the width of the light guide portion on the first region, and an outer surface of the second region of the diffusion layer may include a curved or inclined surface.

According to an embodiment of the invention, a thickness of the second region may be greater than a thickness of the first region. The reflective member includes first and second protrusions protruding inwardly from one side and the other side of the second region, and a region between the first and second protrusions can expose an upper surface of the second region. The width of the first direction of the incident surface of the optical lens can be in a range of 1.5 to 4.5 times an upper width of the diffusion layer.

A vehicle lamp according to an embodiment of the invention includes the lighting device disclosed above, and the lighting device can be arranged as a line-shaped daytime running light.

Advantageous Effects

According to the lighting device according to the embodiment of the invention, a luminous intensity and image can be improved, and various light distribution images can be provided. In addition, the lighting having a line width that can be applied to daytime running lights can be provided, and the light distribution of the line lighting can be provided uniformly.

An embodiment of the invention can improve the light distribution of the lighting device, use the light image in various forms, and improve the optical reliability of the lighting device and the vehicle lamp having the same. The embodiment of the invention can be applied to a light unit having the lighting device, or an external or internal lighting lamp.

DESCRIPTION OF DRAWINGS

FIG. 1 is a side cross-sectional view of a lighting device according to an embodiment.

FIG. 2 is a partially enlarged view of the lighting device of FIG. 1.

FIG. 3 is an example of a plan view of the lighting device of FIG. 1.

FIG. 4 (A) to (C) are drawings showing examples of optical lenses in the lighting device of FIG. 1.

FIG. 5 is a drawing explaining a light extraction path of the lighting device of FIG. 1.

FIGS. 6 to 8 are drawings showing shapes, luminous intensity, and light distribution images according to each direction or position of the optical lens in the lighting device of the invention.

FIG. 9 is a first modified example of the side cross-sectional view of the lighting device of FIG. 1.

FIG. 10 is a partially enlarged view of FIG. 9.

FIG. 11 is a drawing showing light distribution images according to each direction or position on the optical lens of FIG. 9.

FIG. 12 is a drawing showing the luminous intensity of the lighting device of FIG. 9.

FIG. 13 is a side cross-sectional view showing a second modified example of the lighting device of FIG. 1.

FIG. 14 is a drawing showing a light distribution image according to each direction or position on the optical lens of FIG. 13.

FIG. 15 is a drawing showing the luminous intensity of the lighting device of FIG. 13.

FIG. 16 is a side cross-sectional view showing a third modified example of the lighting device of FIG. 1.

FIG. 17 is a drawing showing a light distribution image according to each direction or position on the optical lens of FIG. 16.

FIG. 18 is a drawing showing the luminous intensity of the lighting device of FIG. 16.

FIG. 19 is a drawing comparing the light uniformity according to the height of the lighting module in the lighting device according to an embodiment of the invention.

FIG. 20 is a drawing showing a lamp having a lighting device according to an embodiment of the invention.

FIG. 21 is an example of a vehicle taillight of FIG. 20.

FIG. 22 is a drawing for explaining a vehicle driving light to which the lighting device of the invention is applied.

BEST MODE

Hereinafter, preferred embodiments of the invention will be described in detail with reference to the accompanying drawings.

The technical idea of the present invention is not limited to some of the described embodiments, but can be implemented in various different forms, and if it is within the scope of the technical idea of the present invention, one or more of its components may be selectively combined and substituted between embodiments. In addition, terms (including technical and scientific terms) used in the embodiments of the present invention, unless explicitly specifically defined and described, may be interpreted as a meaning that may be generally understood by those skilled in the art to which the present invention belongs, and terms generally used, such as terms defined in the dictionary, may be interpreted in consideration of the context of the related technology. Terms used in the embodiments of the present invention are for describing the embodiments and are not intended to limit the present invention. In the present specification, the singular form may include a plural form unless specifically described in the phrase, and may include at least one of all combinations that may be combined as A, B, and C when described as “A and/or at least one (or more than one) of B and C”. Also, terms such as first, second, A, B, (a), and (b) may be used to describe components of an embodiment of the present invention. These terms are intended only to distinguish the components from other components and are not determined by their nature, sequence, or order. Also, when a component is described as being 'connected', 'coupled' or 'connected' to another component, not only when the component is directly connected, coupled or connected to another component, it may also be 'connected', 'coupled', or 'connected' due to another component between that component and the other component. In addition, when each component is described as being formed or disposed "up (above) or down (bottom)", the up (down) or down (bottom) includes not only when two components are in direct contact with each other, but also when one or more components are formed or disposed between two components. Also, when expressed as "up (above) or down (bottom)", it may include the meaning of not only the upward direction but also the downward direction based on one component.

The lighting device according to the embodiment can be applied to various lamp devices requiring lighting, such as vehicle lamps, household lighting devices, and industrial lighting devices. For example, when applied to vehicle lamps, it can be applied to head lamps, side mirror lights, side maker lights, fog lights, tail lamps, brake lights, daytime running lights, vehicle interior lights, door scars, rear combination lamps, backup lamps, and the like. The lighting device of the invention can be applied to indoor and outdoor advertising devices, display devices, and various types of electric vehicles, and can also be applied to all lighting-related fields or advertising-related fields that are currently developed and commercialized or can be implemented in the future with technological advancement.

<Lighting Device>

FIG. 1 is a side cross-sectional view of a lighting device according to an embodiment, FIG. 2 is a partially enlarged view of the lighting device of FIG. 1, FIG. 3 is an example of a plan view of the lighting device of FIG. 1, FIG. 4 (A)-(C) is drawings showing examples of optical lenses in the lighting device of FIG. 1, and FIG. 5 is a drawing explaining a light extraction path of the lighting device of FIG. 1.

Referring to FIGS. 1 to 5, a lighting device 100 according to an embodiment of the invention includes a lighting module 10 and an optical lens 51. The lighting module 10 may include a substrate 11, a light source 13 arranged on the substrate 11, and a light guide portion 15 covering the light source 13. The lighting module 10 may further include a diffusion layer 17 on the light guide portion 15. The lighting module 10 may have an upper width D1 in a first direction X smaller than a length in a second direction Y. The lighting module 10 may provide line light having a narrow upper width D1 and a long length in the second direction Y, and the line light may have a width equal to the upper width D1 of the lighting module 10 and may be emitted with a uniform surface light distribution. In the drawing, the X direction may be the first direction, the Y direction may be the second direction orthogonal to the X direction, and the Z direction may be the thickness direction of the lighting module 10 and the third direction orthogonal to the first and second directions.

The height T1 of the lighting module 10 may be larger than the width D1 in the first direction X and smaller than the length in the second direction Y. Here, a ratio of the height T1 and the width D1 may be arranged as 4:3 to 10:3, and the height T1 may be 4 mm or more, for example, in a range of 4 mm to 10 mm, and the width D1 may be 7 mm or less, for example, in a range of 3 mm to 7 mm or in a range of 4 mm to 6.5 mm. The height T1 may be 1.3 times or more of the width D1, for example, 1.3 to 3 times or 1.3 to 2.5 times. Since the lighting module 10 has a thin width D1, the lighting module 10 may have a ductility that is convexly or concavely deformed in the first direction X with respect to the second direction Y. In addition, since the lighting module 10 has a low height T1, the lighting module 10 may have a ductility that is convexly or concavely deformed in the third direction Z with respect to the second direction Y. In addition, the optical lens 51 may have ductility in the same direction as the lighting module 10.

The substrate 11 of the lighting module 10 may include a printed circuit board (PCB). The substrate 11 may include, for example, at least one of a resin-based printed circuit board (PCB), a metal core PCB, a flexible PCB, a ceramic PCB, or an FR-4 substrate. When the substrate 11 is a flexible PCB, the lighting device 100 having the lighting module 10 may be provided with flexibility.

The substrate 11 may be electrically connected to the light source 13. The substrate 11 includes a wiring layer (not shown) on an upper side, and the wiring layer may be electrically connected to the light source 13. When the light sources 13 are arranged in plurality of light sources on the substrate 11, the plurality of light sources 13 may be connected in series, in parallel, or in series-parallel by the wiring layer. The substrate 11 may function as a base member or a support member disposed at lower portion of the light source 13 and the light guide portion 15.

The upper surface of the substrate 11 may have an X-Y plane. The upper surface of the substrate 11 may be a flat plane or a curved surface. The thickness of the substrate 11 may be a height in the vertical direction or the Z direction. When a plurality of light sources 13 are arranged on the substrate 11, the plurality of light sources 13 may be arranged in the second direction Y.

The substrate 11 may be made of a flexible material, and the flexible substrate may be closely attached to the housing of a lamp in a vehicle. The substrate 11 may include a light-transmitting material through which light is transmitted through the upper surface and the lower surface. The light-transmitting material may include at least one of PET (Polyethylene terephthalate), PS (Polystyrene), and PI (Polyimide).

A reflective layer (not shown) may be arranged on the substrate 11. The reflective layer is arranged between the substrate 11 and the light guide portion 15 and may reflect incident light. The reflective layer may include a metallic material or a non-metallic material. The metallic material may include a metal such as aluminum, silver, or gold. The non-metallic material may include a plastic material or a resin material.

The width of the substrate 11 in the first direction X within the lighting module 10 may be greater than an upper width D1 of the lighting module 10. The width of the substrate 11 in the first direction X may be greater than the width D1 of the lighting module 10. Here, the width of the lighting module 10 may be the upper width of the light guide portion 15 or the upper width of the diffusion layer 17.

The light source 13 is arranged between the substrate 11 and the light guide portion 15, and emits light through the upper surface or through the upper surface and side surfaces. The plurality of light sources 13 may be arranged along the length direction or the second direction Y of the substrate 11. The light sources 13 is arranged at the lower portion of the light guide portion 15, and may be arranged in a single row or two rows along the length direction of the lighting module 10. The light source 13 may be embedded in the light guide portion 15. That is, the light guide portion 15 seals the light source 13. The upper surface of the light source 13 may be arranged above the lower surface of the light guide portion 15, and multiple side surfaces and the upper surface of the light source 13 may be in contact with the light guide portion 15.

The light source 13 emits light with the highest intensity in the third direction Z or the optical axis direction. The light source 13 is electrically connected to the substrate 11 and may be provided as an LED chip or a package that covers the surface of the LED chip with resin. The light source 13 is a light emitting device having a light emitting diode (LED) and may include a package in which a light emitting chip is packaged. The light emitting chip may emit at least one of blue, red, green, ultraviolet (UV), or infrared, and the light source 13 may emit at least one of white, blue, red, green, or infrared light, for example, may emit light in colored colors such as white, blue, or green.

The light guide portion 15 may be arranged on a portion of the upper surface of the substrate 11. The lower surface of the light guide portion 15 may face or contact the substrate 11. The width D1 of the first direction X of the light guide portion 15 may be the same as the width of the lighting module 100 and may be smaller than the width of the first direction X of the substrate 11. When a reflective layer is arranged on the upper surface of the substrate 11, the light guide portion 15 may be in contact with the reflective layer.

The length of the second direction Y of the light guide portion 15 may be the same as or smaller than the length of the second direction of the substrate 11. The length of the light guide portion 15 in the second direction Y may be the same as the length of the lighting module 10 or may be 80% or more of the length of the lighting module 10 or the substrate 11. Since the light guide portion 15 is extended in the length direction, surface light having a line width can be provided through the lighting module 10. The length of the second direction Y of the light guide portion 15 may be provided as twice or more of the width D1 of the first direction X, for example, in a range of 2 to 200 times or in a range of 50 to 200 times. The width of the first direction X of the light guide portion 15 may be 7 mm or less, for example, in a range of 3 to 7 mm or in a range of 4 to 6.5 mm.

The lower surface area of the light guide portion 15 may be smaller than the upper surface area of the substrate 11. Both side surfaces of the light guide portion 15 may be arranged further outward than both side surfaces of the light source 13. Accordingly, the light guide portion 15 may seal the light sources 13, prevent moisture penetration, and sufficiently diffuse light. Here, the outer region of the upper surface of the substrate 11 can be exposed from the lower surface of the light guide portion 15.

The height or thickness T4 of the light guide portion 15 may be 80% or more of the height T1 from the lower surface of the substrate 11 to the upper surface of the diffusion layer 17. That is, the thickness T4 of the light guide portion 15 can be 80% or more and less than 100% of the height T1 of the lighting module 10. Accordingly, the light guide portion 15 can guide the light emitted from the light source 13 in the emission direction and improve the diffusion efficiency of the light.

Both side surfaces of the light guide portion 15, that is, long side surfaces, may be provided as vertical planes. Coating layers of a reflective material may be formed on both side surfaces of the light guide portion 15. The coating layer of the reflective material may reflect the incident light toward the emission side and suppress light loss. The above-described reflective material coating layer can reflect the incident light toward the emission side and suppress light loss.

The light guide portion 15 may be formed of a transparent material. The light guide portion 15 may include a resin material such as silicone or epoxy. The light guide portion 15 can include a thermosetting resin material, and can optionally include, for example, PC, OPS, PMMA, PVC, etc. The light guide portion 15 may be formed of glass, but is not limited thereto. For example, the main material of the light guide portion 15 may use a resin material whose main ingredient is urethane acrylate oligomer.

Since the light guide portion 15 is provided as a layer that guides light with resin, the light guide portion 15 may be provided with a thin thickness compared to glass material and can be provided as a flexible plate. The light guide portion 15 can emit point light emitted from the light source 13 as line light or area light having a line width.

The light guide portion 15 may include a bead (not shown), and the bead may diffuse and reflect incident light to increase the amount of light. The bead may be composed of any one selected from silicon, silica, glass bubble, PMMA (Polymethyl methacrylate), urethane, Zn, Zr, $Al_2O_3$, and acryl. The light guide portion 15 may protect the internal light sources 13 and reduce the loss of light emitted from the light sources 13. The light sources 13 may overlap the emission surface of the light guide portion 15 in a vertical direction.

The diffusion layer 17 may be disposed on the light guide portion 15. The diffusion layer 17 may diffuse light incident from the light guide portion 15. The diffusion layer 17 may include a diffusion agent therein, and the diffusion agent may include at least one of $Al_2O_3$, $TiO_2$, $SiO_2$, ZnO, and $ZrO_2$. The diffusion layer 17 may be formed of a transparent resin or a translucent resin material. The diffusion agent in the diffusion layer 17 may be in a range of 8 wt % or more, for example, 8 wt % to 20 wt %, and a hot spot may be generated if it is less than the range, and if it is greater than the range, light extraction efficiency may be degraded.

The thickness T5 or height of the diffusion layer 17 may be less than the thickness T4 or height of the light guide portion 15, and may be less than 50% of the thickness T4 of the light guide portion 15. The thickness T5 or height of the diffusion layer 17 may be 1.5 mm or less, for example, in the range of 0.8 mm to 1.5 mm. When the diffusion layer 17 is within the above range, the diffusion effect may be improved and the decrease in luminous intensity may be suppressed.

The lower surface of the diffusion layer 17 is adhered to the upper surface of the light guide portion 15 and may be extended long along the light guide portion 15. The width of the diffusion layer 17 in the first direction may be equal to or smaller than the width D1 of the light guide portion 15 in the first direction, and the length in the second direction may be equal to or smaller than the length of the light guide portion 15 in the second direction. Since the diffusion layer 17 is disposed on the upper portion of the lighting module 10, the problem of a hot spot occurring on the upper portion of the light source 13 may be suppressed.

The upper surface of the diffusion layer 17 may have a convex curve, and for example, the corner portion between the upper surface and the side surface of the diffusion layer 17 may have a curve.

Here, the upper surface of the light guide portion 15 is provided as a flat surface or a horizontal surface, and the upper surface of the diffusion layer 17 is provided as a convex curve, so that the incident light may be transmitted to a wide region of the incident surface 53 of the optical lens 51.

The optical lens 51 may be disposed on the lighting module 10. The optical lens 51 may be disposed on the diffusion layer 17 of the lighting module 10. The optical lens 51 may include an incident surface 53 and an exit surface 55. A portion of the incident surface 53 faces the lighting module 10, and light emitted from the lighting module 10 is incident. The incident surface 53 may be a concave curved surface, a convex curved surface, or a horizontal plane in the short axis direction. The exit surface 55 may refract light incident through the incident surface 53 when it is guided through the interior. The exit surface 55 may irradiate or collect parallel light. The exit surface 55 may be provided in a convex hemispherical shape or a shell shape. As another example, the exit surface 55 may include a Fresnel lens pattern. The optical lens 51 may be composed of a condenser lens, a parallel light lens, a collimator lens, or a Fresnel lens.

The incident surface 53 of the optical lens 51 is disposed on the upper portion of the light guide portion 15 and may face the upper surface of the diffusion layer 17. The incident surface 53 may be spaced apart from the upper surface of the diffusion layer 17. Since the incident surface 53 of the optical lens 51 is spaced apart from the upper surface of the diffusion layer 17, light diffused through the diffusion layer 17 may be incident on a wide region of the incident surface 53. An interval G1 between the incident surface 53 and the diffusion layer 17 may be 0.01 mm or more, for example, in the range of 0.01 mm to 0.5 mm. Here, the width D2 of the incident surface 53 is the lower surface width of the optical lens 51, may be larger than the upper width D1 of the lighting module 10, and may be 1.5 times or more, for example, in the range of 1.5 to 10 times or in the range of 2 to 10 times the upper width D1 of the lighting module 10. The maximum width D2 of the optical lens 51 in the first direction X may be smaller than or different from the height T2. When the maximum width D2 of the first direction X of the optical lens 51 is greater than the height T2, the luminous intensity may decrease and the line width may increase. When the maximum width D2 of the first direction X of the optical lens 51 is smaller than the height T2, the luminous intensity may increase and the line width may decrease. Accordingly, the maximum width D2 and the height T2 of the optical lens 51 in the first direction X may be adjusted to suit the light distribution image.

The length of the optical lens 51 in the second direction Y may be equal to or greater than the length of the lighting module 10. Accordingly, when viewed from the outside of the lighting device 100, a surface of the optical lens 51 may be exposed, and an upper configuration of the lighting module 10 may not be exposed.

The optical lens 51 may include a light-transmitting material, and may optionally include, for example, PC, OPS, PMMA, PVC, etc. The optical lens 51 may include a resin material such as silicone or epoxy or a thermosetting material. The refractive index of the optical lens 51 may be in the range of 1.4 to 1.6. Since the optical lens 51 has the material and refractive index as described above, it can refract the incident light toward the target without loss. The optical lens 51 may emit light as a surface light having a line width of 30 mm or less in the first direction X and a long length in the second direction Y. Accordingly, the external image of the lighting device 100 may be provided as an image having the line width. That is, as shown in FIG. 21, it may emit light as an image having the line width.

As shown in FIG. 4 (A)-(C), the optical lens 51 may have a concave curved shape or a convex curved shape based on the length direction, or may have a shape in which one end and the other end of the optical lens 51 are twisted in opposite directions.

As shown in FIG. 4 (A), an incident surface 53A of the optical lens 51 has a convex surface having a first radius of curvature in the short-axis direction, as shown in FIG. 4 (B), an incident surface 53B has a convex surface having a second radius of curvature greater than the first radius of curvature in the short-axis direction, and as shown in FIG. 4(C), an incident surface 53C has a concave surface having a third radius of curvature in the short-axis direction. The first and second radii of curvature have a difference of 20 mm or more and have a positive radius of curvature, and the third radius of curvature has a negative radius of curvature, and may have a difference of 20 mm or more from the first radius of curvature in absolute value. The first radius of curvature is 50 mm or more, and the second and third radii of curvature are less than 50 mm, and may be the same as each other or have a difference of 5 mm or less.

The lighting device 100 may include at least one or both of a housing 31 and a reflective member 40 for coupling to a moving body such as a vehicle. The housing 31 may support the lighting module 10 and the reflective member 40. The housing 31 supports the lower surface of the substrate 11 of the lighting module 10, and both side extension portions 32 and 33 extending in the width direction support an outer lower surface of the reflective member 40. The housing 31 may be a heat dissipation member.

The reflective member 40 has an insertion hole R1 therein and includes first and second bottom portions 41 and 41A disposed on both sides of the substrate 11. The first and second bottom portions 41 and 41A may be connected to each other on both short sides in the length direction of the lighting module 10. The reflective member 40 includes first and second reflective portions 42 and 43 on both sides of the insertion hole R1, and the first and second reflective portions 42 and 43 have the insertion hole R1 inside and may protrude from the inside of the first and second bottom portions 41 and 41A toward the incident surface 53. The width of the insertion hole R1 in the first direction X may be smaller than the length in the second direction Y. The width of the insertion hole R1 in the first direction corresponds to the width of the light guide portion 15 in the first direction, and the length in the second direction corresponds to the length of the light guide portion 15 in the second direction. The insertion hole R1 has a line shape in the top view.

The first and second reflective portions 42 and 43 may be disposed on both long sides of the light guide portion 15. The first and second reflective portions 42 and 43 may be extended to both sides of the insertion hole R1. Accordingly, the first and second reflective portions 42 and 43 may reflect light incident on both long sides of the light guide portion 15 and re-incident it into the light guide portion 15. The first and second reflective portions 42 and 43 may be connected to each other on both short sides of the light guide portion 15 in the length direction.

The reflective member 40 includes a concave portion C0 that is concavely recessed, and the concave portion C0 may include a region lower than the incident surface 53 of the optical lens 51. An interval G1 between the diffusion layer 17 and the incident surface 53 may be provided at a center interval in the concave portion C0. The interval G1 is a distance spaced in the vertical direction, and the width of the region having the interval G1 may be smaller than the width of the lower surface of the diffusion layer 17 in the first direction X, and the length may be equal to the length of the diffusion layer 17 in the second direction Y.

A height G4 of the upper end of the first and second reflective portions 42 and 43 is a height from the bottom of the concave first and second grooves C1 and C2, and may be positioned higher than the upper end of the light guide portion 15. Accordingly, the first and second reflective portions 42 and 43 may reflect light leaking through the side of the light guide portion 15, thereby improving the light extraction efficiency of the lighting module 10. The first and second grooves C1 and C2 may be disposed on both sides of the concave portion C0. The first and second grooves C1 and C2 may be disposed on both sides of the first direction X of the concave portion C0. The first and second grooves C1 and C2 may be disposed on both sides of the first and second directions of the concave portion C0.

The height G4 of the upper end of the first and second reflective portions 42 and 43 of the reflective member 40 may be arranged lower than the upper end of the diffusion layer 17. That is, the interval G2 between the first and second reflective portions 42 and 43 and the incident surface 53 may be greater than the interval G1 between the diffusion layer 17 and the incident surface 53. Accordingly, the first and second reflective portions 42 and 43 reflect light incident through the side surface of the light guide portion 15 and enable light emission through the side surface of the diffusion layer 17. In addition, the upper surfaces of the first and second reflective portions 42 and 43 may reflect light emitted through the diffusion layer 17 to the incident surface 53 of the optical lens 51.

The reflective member 40 includes first and second lens support portions 45 and 46, and the first and second lens support portions 45 and 46 may be disposed along the outer edge of the optical lens 51. The first and second lens support portions 45 and 46 have a stepped structure 45A and 46A that is concavely stepped inward from the upper end thereof, and the stepped structure 45A and 46A supports the outer edge of the optical lens 51. As shown in FIG. 3, the first and second lens support portions 45 and 46 may further include a stepped structure 45B and 46B that supports the outer edge of the optical lens 51 in a short side.

The upper ends of the first and second lens support portions 45 and 46 may be positioned higher than the lower end or the outer edge of the incident surface 53 of the optical lens. Accordingly, the lower edge of the optical lens 51 may be coupled along the inner upper ends of the first and second lens support portions 45 and 46. At this time, the lower edge of the optical lens 51 may be bonded to the stepped structure 45A and 46A with an adhesive. The height G3 of the stepped structure 45A and 46A may be smaller than the height to the upper ends of the first and second lens support portions 45 and 46 and larger than the height to the upper surface of the diffusion layer 17. Since the height G4 from the substrate 11 to the stepped structure 45A and 46A is positioned higher than a position of the upper surface of the diffusion layer 17, the incident surface 53 of the optical lens 51 and the diffusion layer 17 may be spaced apart from each other.

The width D3 of the first direction X of the reflective member 40 may be greater than the lower width D2 of the optical lens 51. The height T3 from the lower surface of the substrate 11 to the upper end of the optical lens 51 may be equal to or greater than the width D3 of the reflective member 40 in the first direction. In this case, the optical lens 51 may have a hemispherical exit surface. As another example, the height T3 from the lower surface of the substrate 11 to the upper end of the optical lens 51 may be equal to or less than the width D3 of the reflective member 40 in the first direction. In this case, the exit surface 55 of the optical lens 51 may include a Fresnel lens pattern.

The reflective member 40 includes first and second recesses R2 and R3 on the bottom, and the upper portion of the housing 31 may be received or coupled to the second recess R3. The second recess R3 includes the first recess R2 on the inside, and the substrate 11 may be inserted or received into the first recess R2. The first recess R2 has a depth equal to or greater than the thickness of the substrate 11 from the second recess R3, so that the lower surface of the substrate 11 may have a depth that does not protrude outward from the first recess R2. The substrate 11 may be adhered to the housing 31 with an adhesive, or may be adhered to the reflective member 40 within the first recess R2.

A width of the first recess R2 may be smaller than a width of the second recess R3, and the width of the second recess R3 may be the width of the upper surface of the housing 31, which is equal to or greater than 80% of the width D2 of the lower surface of the optical lens 51, such that the housing 31 may be supported at the lower portion of the lighting device 100. As another example, when the housing 31 is a heat dissipation member made of a metal or non-metal material, it can effectively dissipate heat transferred from the substrate 11. The upper ends of the both side extension portions 32 and 33 of the housing 31 may be in contact with or coupled with the both lower ends of the reflective member 40, and may prevent the reflective member 40 from being pushed downward or tilted.

The reflective member 40 may include a first groove C1 on one side of the concave portion C0 and a second groove C2 on the other side. The first groove C1 may be concavely disposed between the first reflective portion 42 and the first lens support portion 45, and the second groove C2 may be concavely disposed between the second reflective portion 43 and the second lens support portion 46. The width D4 of each of the first and second grooves C1 and C2 is disposed in a region that is equal to or larger than the width D1 of the light guide portion 15, and the surfaces of the first and second grooves C1 and C2 may reflect light reflected through the incident surface 53 of the optical lens 51. The first and second grooves C1 and C2 are extended along the long side of the light guide portion 15 and may be connected to each other on the short side of the light guide portion 15.

For the purpose of explaining FIGS. 6 to 8, each optical lens will be defined as a first to sixth lens. FIG. 6(A) is a shape of the first lens having a convex incident surface and a convex exit surface with a first radius of curvature, and FIG. 6(B) is a shape of the second lens having a convex incident surface and a convex exit surface with a second radius of curvature. FIG. 7(A) is a shape of the third lens having a concave incident surface and a convex exit surface with a third radius of curvature, and FIG. 7(B) is a shape of the fourth lens having a flat incident surface and an exit surface of a Fresnel lens pattern. FIG. 8(A) is a shape of the fifth lens having a flat incident surface and a convex exit surface, and FIG. 8(B) is a shape of the sixth lens having the same shape as the fifth lens but a different material.

The material of the first to fifth lenses is PMMA, and the material of the sixth lens is PC. The difference between the first and second curvature radii is less than 20 mm, and the first curvature radius is 50 mm or more, for example, in a range of 50 mm to 90 mm, and the second curvature radius may be less than 50 mm, for example, in a range of 10 mm to 49 mm. The third curvature radius has a negative curvature radius, and may be less than 20 and less than 50 mm, for example, in a range of 10 mm to 49 mm, in absolute value with respect to the radius of the first lens.

The luminous intensity of the third lens is greater than that of the first, second, fourth, fifth, and sixth lenses, and the second lens may be the smallest. It may be seen that the luminous intensity of the sixth lens is lower than that of the first, third, fourth, and fifth lenses. Accordingly, it may be seen that the optical lens is made of PMMA material and a high luminous intensity when it is the concave incident surface or the flat incident surface and the convex exit surface.

In FIGS. 6 to 8, when the lighting device disclosed above is applied to the front, rear, side, or inside of a moving body, 10U (Up) is a drawing viewed from 10 degrees upward, 5U (Up) is a drawing viewed from 5 degrees upward, HV is a drawing viewed from the intersection of the horizontal and vertical positions based on the lighting device of the moving body, and 10L (Left), 20L, 40L, 60L, and 80L are drawings viewed from the left at 10 degrees, 20 degrees, 40 degrees, 60 degrees, and 80 degrees, respectively.

In FIGS. 6 to 8, it may be seen that the light distribution image at 10U (Up) shows that the first lens, the third lens, the fifth lens, and the sixth lens uniformly distribute light. The light distribution image at 5U (Up) shows that the light distribution of the first lens, the third lens, the fourth lens, and the fifth lens is uniform. The light distribution image at HV shows that the fourth lens, the fifth lens, and the sixth lens have uniform distributions, and the light distribution images at 10L (Left), 20L, 40L, 60L, and 80L show that the fourth lens and the fifth lens have more uniform distributions than the other lenses. Therefore, the light distribution image and the light intensity of the first, third, or fifth lens are higher than those of the other lenses. This can provide a uniform distribution of the light distribution image by using a lens having a concave or convex incident surface with a radius of curvature in the width direction of less than 50 and a convex exit surface.

When comparing the luminous intensity when the width of the lighting module is 3 mm and when it is 4 mm, it may be seen that the luminous intensity at the width of 3 mm is higher than the luminous intensity at the width of 4 mm at the HV point and its surroundings H5L and H5R. When comparing the luminous intensity when the height of the lighting module is 6 mm and when it is 5 mm, it may be seen that the luminous intensity is higher than the reference value in all regions when the heights are 5 mm and 6 mm. When comparing the luminous intensity when the height of the lighting module is 7 mm and when it is 4 mm, it may be seen that even if there is a difference in the height of the lighting module, each lighting module shows the luminous intensity higher than the reference value in all regions.

Hereinafter, modified examples of FIG. 1 will be described, and the configuration of the modified examples may be selectively applied to the same configuration as the configuration of the embodiment disclosed above, and redundant description will be omitted. These lighting modules may have ductility characteristics according to the ductility characteristics of the optical lens, and the configuration of the housing disclosed in FIG. 1 may be optionally included.

FIG. 9 is a first modified example of a side cross-sectional view of the lighting device of FIG. 1, FIG. 10 is a partial enlarged view of FIG. 9, FIG. 11 is a drawing showing a light distribution image according to each direction or position on the optical lens of FIG. 9, and FIG. 12 is a drawing showing the luminous intensity of the lighting device of FIG. 9. Referring to FIGS. 9 and 10, the lighting device 100A includes a lighting module 10 and an optical lens 51. The lighting module 10 may include a substrate 11, a light source 13 arranged on the substrate 11, and a light guide portion 15 covering the light source 13. The lighting module 10 may further include a diffusion layer 17 on the light guide portion 15.

The width D1 of the first direction X of the light guide portion 15 may be the same as the width of the lower surface and the width of the upper surface. The diffusion layer 17 is disposed on the light guide portion 15 and may be spaced apart from the incident surface 53 of the optical lens 51 by a predetermined interval G1.

The upper width D5 of the diffusion layer 17 in the first direction X may be smaller than the width of the lower surface (e.g., D1). By providing the upper width D5 of the diffusion layer 17 in the first direction X to be narrower than the width of the lower surface, the diffusion layer 17 can provide higher luminous intensity. In addition, by providing the upper width of the diffusion layer 17 to be narrower than the width of the lower surface, a hot spot in the light emitted through the optical lens 51 can be prevented. That is, when the upper width of the diffusion layer 17 is made the same as the lower width, light emitted from the edge portion of the first direction of the diffusion layer 17 is emitted as a surface light image through the optical lens 51, and at this time, a hot spot may occur along one side or the edge of the surface light image. Therefore, a modified example of the invention provides the upper width of the diffusion layer 17 to be narrower than the width of the light guide portion 15, so that a hot spot caused by light traveling to the edge of the diffusion layer 17 can be prevented.

In the diffusion layer 17, the thickness T51 of the first region 17B having the lower width D1 may be smaller than the thickness T52 of the second region 17C having a width smaller than the lower width D1. The first region 17B is a region that is adhered to the upper surface of the light guide portion 15, and the second region 17C may include at least one of an inclined surface, a convex curved surface, or a vertically stepped surface from the upper end of the first region 17B. Preferably, the outer region of the second region 17C may include an inclined surface or a curved surface.

The upper surface 17A of the diffusion layer 17 may be provided as a flat surface or the highest surface between the upper ends of the second region 17C. As another example, the upper surface 17A of the diffusion layer 17 may be provided as a rough structure. The upper width D5 of the diffusion layer 17 is a width of a region exposed to the upper portion R11 of the through hole R1, and may be larger than the width D6 of the upper surface 17A. In addition, since the width D6 of the upper surface 17A of the diffusion layer 17 is provided to be smaller than the width (i.e., D5) of the upper portion R11 of the through hole R1 of the second region 17C, light traveling toward the lower edge of the diffusion layer 17 can be guided toward the center or in the direction of the optical axis. The width D1 of the light guide portion 55 may be 7 mm or less, for example, in a range of 3 mm to 7 mm or in a range of 4 mm to 6.5 mm. A width of the lower surface of the diffusion layer 17 may be 7 mm or less, for example, in a range of 3 mm to 7 mm or in a range of 4 mm to 6.5 mm. The upper surface width D5 of the diffusion layer 17 may be 6 mm or less, for example, in a range of 3 mm to 6 mm or in a range of 4 mm to 5.5 mm. The width D6 of the upper surface of the diffusion layer 17 may have a difference of 1 mm or less from the upper width D5.

The width D2 of the incident surface 53 of the optical lens 51 in the first direction X may be 1.5 times or more the upper width D5 of the lighting module 10 or the upper width D5 of the diffusion layer 17, for example, in the range of 1.5 to 2.5 times or 1.7 to 2.3 times. This reduces the upper width D5 of the diffusion layer 17, thereby reducing the width D2 of the incident surface 53 of the optical lens 51. The width D2 of the incident surface 53 of the optical lens 51 in the first direction X may be greater than 5 mm.

The lighting device 100A may include at least one or both of a housing 31 (see FIG. 1) and a reflective member 40 in order to be coupled to a moving body such as a vehicle. The housing 31 (see FIG. 1) may support the lighting module 10 and the reflective member 40.

The reflective member 40 includes a concave portion C0 that is concavely recessed at the upper portion thereof, and the concave portion C0 may include a region lower than the incident surface 53 of the optical lens 51. The concave portion C0 may be provided with an interval G1 between the diffusion layer 17 and the incident surface 53 as a center interval. The interval G1 is a distance spaced in the vertical direction, and the width of the region having the interval G1 may be smaller than the width of the lower surface of the diffusion layer 17 in the first direction X, and the length may be equal to the length of the diffusion layer 17 in the second direction Y.

The reflective member 40 may have an insertion hole R1 therein, and may include first and second reflective portions 42A and 43A on both sides of the insertion hole R1. The first and second reflective portions 42A and 43A may have the insertion hole R1 therein, and may protrude toward the incident surface 53 of the optical lens 51. The width of the insertion hole R1 in the first direction X may be smaller than the length in the second direction Y. The width of the insertion hole R1 in the first direction may correspond to the width of the light guide portion 15 in the first direction, and the length in the second direction may correspond to the length of the light guide portion 15 in the second direction. The insertion hole R1 has a top-view shape of a long line in the second direction.

The first and second reflective portions 42A and 43A may be disposed on both long sides of the light guide portion 15. The first and second reflective portions 42A and 43A may be extended to both sides of the insertion hole R1. Accordingly, the first and second reflective portions 42A and 43A may reflect light incident on both long sides of the light guide portion 15 and re-incident it into the light guide portion 15. The first and second reflective portions 42A and 43A may be connected to each other on both short sides of the light guide portion 15 in the length direction.

The upper width (i.e., D5) of the insertion hole R1 in the first direction X may be smaller than the lower width (e.g., D1). Here, the reflective member 40 may include a first protrusion P1 and a second protrusion P2 that protrude inwardly from the upper end of the insertion hole R1. The first protrusion P1 may extend obliquely inwardly from one upper side of the first region 17B of the diffusion layer 17. The second protrusion P2 may extend obliquely inwardly from the other upper side of the first region 17B of the diffusion layer 17.

The second region 17C of the diffusion layer 17 may be exposed as a region between the first and second protrusions P1 and P2. The upper surface 17A of the diffusion layer 17 may be the same plane as the upper surfaces of the first and second protrusions P1 and P2, or may be arranged within a range of +0.5 mm based on the upper surfaces of the first and second protrusions P1 and P2. A protrusion length D7 of each of the first and second protrusions P1 and P2 is a distance between the inner surface and the straight line extending from the side surface of the light guide portion 15, and may be in the range of 0.5 mm+0.1 mm. By using this protrusion length D7, the upper width of the diffusion layer 17 can be reduced, thereby preventing a hot spot.

The inner surface of the first and second protrusions P1 and P2 may include an inclined surface or a concave curved surface. The minimum interval between the first and second protrusions P1 and P2 may be greater than the width D6 of the upper surface of the diffusion layer 17, and may be equal to the upper width D5 of the diffusion layer 17. The minimum interval between the first and second protrusions P1 and P2 is a width for exposing the upper portion of the diffusion layer 17, and may be a width at which the second region 17C is exposed to the upper portion R11 of the insertion hole R1.

The reflective member 40 has first and second lens support members 45 and 46 on both sides of the concave portion C0, and is structured to be able to remove the first and second grooves C1 and C2 disclosed in FIG. 1. Since the entire region of the concave portion C0 of the reflective member 40 faces the incident surface 53 of the optical lens 51 at a constant interval, light loss within the concave portion C0 can be reduced.

The first lens support member 45 may extend or protrude on the first reflective portion 42A, and the second lens support member 46 may extend or protrude on the second reflective portion 43A.

The width D2 of the incident surface 53 of the optical lens 51 in the first direction X may be greater than the height T2. The length of the incident surface 53 of the optical lens 51 in the second direction Y may be greater than the width D2, and the lengths of the incident surface 53 and the exit surface 55 in the second direction may be the same. As another example, the length of the incident surface 53 in the second direction may be greater than the length of the exit surface 55.

As shown in FIG. 11, when the lighting device of FIG. 9 is applied to the front, rear, side or inside of a moving body, 2U (Up) is a drawing viewed from 2 degrees upward based on the intersection point where the horizontal and vertical intersect with respect to the lighting device of the moving body, 10U (Up) is a drawing viewed from 10 degrees upward, 20U (Up) is a drawing viewed from 20 degrees upward, and H-V is a drawing viewed from the intersection point of the horizontal and vertical positions. As shown in these drawings, the lighting device may be provided as a line image having a constant width, and the line width may be smaller when viewed from 10 degrees or 20 degrees upward rather than from 2 degrees. As shown in FIG. 12, it may be seen that the luminous intensity of the lighting device of FIG. 9 does not differ greatly between the center luminous intensity and the edge luminous intensity, and the full width at half maximum (FWHM) of the luminous intensity is 40 degrees or more, for example, about 45±2 degrees.

FIG. 13 is a cross-sectional view showing a second modified example of the lighting device of FIG. 1, FIG. 14 is a drawing showing a light distribution image according to each direction or position on the optical lens of FIG. 13, and FIG. 15 is a drawing showing the luminous intensity of the lighting device of FIG. 13. The second modified example is structurally the same as the first modified example, and is an example in which the width of the incident surface 51 of the optical lens 51 is increased.

Referring to FIG. 13, the lighting device 100A includes a lighting module 10 and an optical lens 51. The lighting module 10 may include a substrate 11, a light source 13 arranged on the substrate 11, and a light guide portion 15 covering the light source 13. The lighting module 10 may further include a diffusion layer 17 on the light guide portion 15.

The width D1 of the first direction X of the light guide portion 15 may be the same as the width of the lower surface and the width of the upper surface. The diffusion layer 17 is arranged on the light guide portion 15 and may be spaced apart from the incident surface 53 of the optical lens 51 by a predetermined interval G1. The width D2 of the incident surface 53 of the optical lens 51 in the first direction X is more than 10 mm and may be 2.5 times or more, for example, 2.5 to 3.5 times, of the upper width D5 of the diffusion layer 17.

The lighting device 100A may include at least one or both of a housing (31 of FIG. 1) and a reflective member 40 in order to be coupled to a moving body such as a vehicle. The housing (31 of FIG. 1) may support the lighting module 10 and the reflective member 40.

As shown in FIG. 14, when the lighting device of FIG. 13 is applied to the front, rear, side or inside of a moving body, 2U (Up) is a drawing viewed from 2 degrees upward based on the intersection point where the horizontal and vertical intersect with respect to the lighting device of the moving body, 10U (Up) is a drawing viewed from 10 degrees upward, 20U (Up) is a drawing viewed from 20 degrees upward, and H-V is a drawing viewed from the intersection point of the horizontal and vertical positions. As shown in these drawings, the lighting device may be provided as a line image having a constant width, and the line width may be smaller when viewed from 10 degrees or 20 degrees upward than from 2 degrees. As shown in FIG. 15, it can be seen that the luminous intensity of the lighting device of FIG. 13 does not differ greatly between the center luminous intensity and the edge luminous intensity, and FWHM of the luminous intensity is less than 40 degrees, for example, approximately 34±2 degrees.

FIG. 16 is a cross-sectional view showing a third modified example of the lighting device of FIG. 1, FIG. 17 is a drawing showing a light distribution image according to each direction or position on the optical lens of FIG. 16, and FIG. 18 is a drawing showing the luminous intensity of the lighting device of FIG. 16. The third modified example is structurally the same as the first modified example, and is a configuration in which the width of the incident surface 51 of the optical lens 51 is increased, and the shape of the reflective member 40 is changed due to the increased width of the incident surface 51 of the optical lens 51.

Referring to FIG. 16, the lighting device 100A includes a lighting module 10 and an optical lens 51. The lighting module 10 may include a substrate 11, a light source 13 arranged on the substrate 11, and a light guide portion 15 covering the light source 13. The lighting module 10 may further include a diffusion layer 17 on the light guide portion 15.

The width D1 of the light guide portion 15 in the first direction X may be the same as the width of the lower surface and the width of the upper surface. The diffusion layer 17 is arranged on the light guide portion 15 and may be spaced apart from the incident surface 53 of the optical lens 51 by a predetermined interval G1. The width D2 of the incident surface 53 of the optical lens 51 in the first direction X is greater than 15 mm and less than 25 mm, and may be 3.5 times or more, for example, 3.5 to 4.5 times, of the upper width D5 of the diffusion layer 17.

The lighting device 100A may include at least one or both of a housing (31 of FIG. 1) and a reflective member 40 in order to be coupled to a moving body such as a vehicle. The housing (31 in FIG. 1) above can support the lighting module 10 and the reflective member 40.

As shown in FIG. 17, when the lighting device of FIG. 16 is applied to the front, rear, side or inside of the moving body, 2U (Up) is a drawing viewed from 2 degrees above based on the intersection point where the horizontal and vertical intersect with respect to the lighting device of the moving body, 10U (Up) is a drawing viewed from 10 degrees above, 20U (Up) is a drawing viewed from 20 degrees above, and H-V is a drawing viewed from the intersection point of the horizontal and vertical positions. As shown in these drawings, the lighting device may be provided as a line image having a constant width, and the line width may be smaller when viewed from 10 degrees above than from 2 degrees, and the line width may be smaller than 50% when viewed from 20 degrees above. As shown in FIG. 18, the luminous intensity of the lighting device of FIG. 16 is not significantly different from the center luminous intensity and the edge luminous intensity, and the FWHM of the luminous intensity is less than 30 degrees, for example, about 27±2 degrees. FIG. 19(A) shows the brightness uniformity when the height of the lighting module disclosed above is 7 mm, and FIG. 19(B) shows the brightness uniformity when the height of the lighting module is 4 mm, and it may be seen that both are 120000 cd/m2.

FIG. 20 is a plan view of a vehicle to which a lighting device according to an embodiment is applied, and FIG. 21 is a drawing showing an example of a tail lamp of the vehicle of FIG. 20.

Referring to FIGS. 20 and 21, a front lamp 2100 in a mobile or vehicle 2000 may include one or more lighting modules, and the driving timing of these lighting modules may be individually controlled to provide not only a function as a conventional headlight, but also additional functions such as a welcome light or a celebration effect when a driver opens a vehicle door. The lamp may be applied to a daytime running light, a high beam, a low beam, a fog light, or a turn signal. A tail lamp 2200 and 800 in a vehicle 2000 may be arranged as a plurality of lamp units 810, 812, 814 and 816 supported by a housing. For example, the lamp units 810, 812, 814 and 816 may include a first lamp unit 810 arranged on the outside, a second lamp unit 814 arranged on the inside periphery of the first lamp unit 810, and third and fourth lamp units 814 and 816 arranged on the inside of the second lamp unit 814, respectively. The first to fourth lamp units 810, 812, 814 and 816 may selectively apply the lighting device disclosed in the embodiment, and a red lens cover or a white lens cover may be arranged on the outside of the lighting device for the lighting characteristics of the lamp unit 810, 812, 814 and 816. The lighting device disclosed in the embodiment applied to the lamp units 810, 812, 814, and 816 may emit surface light with a uniform distribution.

The first and second lamp units 810 and 812 may be provided in at least one of a curved shape, a straight shape, an angular shape, an inclined shape, or a flat shape, or a mixed structure thereof. The first and second lamp units 810 and 812 may be arranged one or more in each tail tamp. The first lamp unit 810 may be provided as a tail lamp, the second lamp unit 812 may be provided as a stop lamp, the third lamp unit 814 may be provided as a reverse light, and the fourth lamp unit 816 may be provided as a turn signal lamp. Such a lighting lamp may provide a higher luminous intensity in the rearward direction than in the lateral direction, and thus may comply with the lighting distribution regulations for stop lamps or tail lamps, etc.

As shown in FIG. 22, a plurality of lighting devices 100 may be arranged as daytime running lights at the front of the vehicle 2000, and may be provided in a line shape each having a convex curve.

Features, structures, effects, etc. described in the embodiments are included in at least one embodiment of the invention, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the invention. In addition, although the embodiments have been mainly described above, this is only an example and does not limit the present invention, and one of ordinary skill in the field to which the present invention belongs will appreciate that various modifications and applications not illustrated above may be possible without departing from the essential characteristics of the present embodiment. For example, each component specifically shown in the embodiment can be implemented by modification. And differences related to such modifications and applications should be construed as being included in the scope of the invention defined in the appended claims.

The invention claimed is:

1. A lighting device comprising:

a lighting module including a substrate having a length in a second direction longer than a width in a first direction; a plurality of light sources arranged in the second direction on the substrate; a light guide portion disposed on the substrate and the light sources;

an optical lens disposed on the lighting module, the optical lens having an incident surface having a width greater than a width in the first direction of the lighting module, and an exit surface from which light incident on the incident surface is emitted; and a reflective member including an insertion hole in which the light guide portion is disposed, a reflective portion to both sides of the insertion hole and covering both sides of the light guide portion, and a support member supporting a lower edge of the optical lens, wherein the light guide portion and the insertion hole have a width in the first direction smaller than a length in the second direction, and wherein an upper end of the reflective portion is positioned higher than an upper end of the light guide portion.

2. The lighting device of claim 1, wherein the exit surface of the optical lens refracts light incident on the incident surface into parallel light.

3. The lighting device of claim 1, comprising a diffusion layer that diffuses light on the light guide portion, wherein an upper end of the diffusion layer is positioned higher than the upper end of the reflective portion.

4. The lighting device of claim 3, wherein the diffusion layer is spaced apart from the incident surface of the light guide portion, and wherein a width of the diffusion layer in the first direction is the same as the width of the light guide portion in the first direction, and a length in the second direction is the same as the length of the light guide portion in the second direction.

5. The lighting device of claim 1, wherein the incident surface is any one of a concave curved surface, a convex curved surface, or a flat surface in a short axis direction.

6. The lighting device of claim 1, wherein the width of the light guide portion in the first direction is in a range of 3 mm to 7 mm, wherein the length of the light guide portion in the second direction is 50 times or more the width in the first direction.

7. A lighting device comprising:

a lighting module including a substrate; a plurality of light sources arranged in one direction on the substrate; a light guide portion covering the plurality of light sources and having a length longer than a width; and a diffusion layer disposed on the light guide portion;

an optical lens disposed on the lighting module, the optical lens having an incident surface having a width greater than the width of the lighting module, and an exit surface from which light incident on the incident surface is emitted; and a reflective member including an insertion hole in which the light guide portion is disposed, a reflective member extending to both sides of the insertion hole and disposed along a periphery of the light guide portion, and a support member supporting a lower edge of the optical lens, wherein the light guide portion and the insertion hole have a length greater than twice a width, wherein the reflective portion of the reflective member is disposed along both long sides and both short sides of the light guide portion, and wherein the lighting module and the optical lens have flexibility in a thickness direction and a width direction of the lighting module with respect to a length direction.

8. The lighting device of claim 7, wherein and upper end of the reflective member is positioned higher than an upper end of the light guide portion and lower than the upper end of the diffusion layer.

9. The lighting device of claim 7, wherein the reflective member has a concave groove between both outer sides of the reflective member at an inner side and both inner sides of the support member at an outer side.

10. A lighting device comprising:

a substrate including a length in a second direction longer than a width in a first direction;

a plurality of light sources arranged in the second direction on the substrate;

a light guide portion disposed on the substrate and covering the plurality of light sources;

a diffusion layer disposed on the light guide portion;

an optical lens having an incident surface spaced apart from the diffusion layer and having a width larger than a width of the diffusion layer in the first direction, and an exit surface from which light incident on the incident surface is emitted; and a reflective member having an insertion hole in which the light guide portion and the diffusion layer are disposed inside, first and second reflective portions extending to both sides of the insertion hole and covering both sides of the light guide portion and the diffusion layer, and a support portion supporting both edges of the optical lens, wherein the diffusion layer has an upper width in the first direction smaller than a width of a lower surface.

11. The lighting device of claim 10, wherein the diffusion layer includes a first region having a width equal to a width of the light guide portion, and a second region having a width smaller than the width of the light guide portion on the first region, wherein an outer surface of the second region of the diffusion layer includes a curved or inclined surface.

12. The lighting device of claim 11, wherein a width of the first direction of the incident surface of the optical lens in a range of 1.5 to 4.5 times the upper width of the diffusion layer.

13. The lighting device of claim 11, wherein the optical lens provides a line light having the width of 30 mm or less in the first direction, and wherein the exit surface of the optical lens has a convex hemispherical shape with respect to the first direction of the optical lens.

14. The lighting device of claim 10, wherein the optical lens and the light guide portion have flexibility with respect to at least one of the first and second directions.

15. The lighting device of claim 10, wherein upper surfaces of the light sources is positioned higher than the lower surface of the light guide portion.

16. The lighting device of claim 10, wherein a width of the substrate in the first direction greater than a width of the light guide portion in the first direction.

17. The lighting device of claim 11, wherein the diffusion layer is adhered to an upper surface of the light guide portion.

18. The lighting device of claim 10, comprising:

a first recess in which the substrate is inserted on a bottom of the reflective member.

19. The lighting device of claim 10, wherein the reflective member includes a concave portion facing the incident surface of the optical lens and disposed between the first and second reflective portions and the support portion.

20. The lighting device of claim 10, comprising:

a housing disposed under the reflective member and the substrate.

* * * * *